(12) United States Patent
Satoh et al.

(10) Patent No.: US 6,282,977 B1
(45) Date of Patent: Sep. 4, 2001

(54) TILT ADJUSTING-TYPE STEERING APPARATUS

(75) Inventors: Kenji Satoh, Gunma-ken; Sakae Matsumoto, Takasaki, both of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/176,886

(22) Filed: Oct. 22, 1998

(30) Foreign Application Priority Data

| Oct. 28, 1997 | (JP) | 9-311027 |
| Nov. 13, 1997 | (JP) | 9-327174 |
| Jan. 20, 1998 | (JP) | 10-021613 |
| Mar. 24, 1998 | (JP) | 10-093857 |
| Aug. 4, 1998 | (JP) | 10-231124 |

(51) Int. Cl.$^7$ ................................................. B62D 1/18
(52) U.S. Cl. ................................................ 74/493; 280/775
(58) Field of Search ............................... 74/493; 280/775

(56) References Cited

U.S. PATENT DOCUMENTS

| 3,199,625 | 8/1965 | Liebreich . | |
| 4,470,322 | 9/1984 | Beauch | 74/493 |
| 4,594,909 | 6/1986 | Yamaguchi | 74/493 |
| 4,607,540 | * 8/1986 | Kinoshita et al. | 74/493 |
| 4,892,330 | * 1/1990 | Beauch | 280/775 |
| 4,938,093 | * 7/1990 | Matsumoto et al. | 74/493 |
| 5,029,489 | * 7/1991 | Burmeister et al. | 74/493 |
| 5,078,022 | * 1/1992 | Ichikawa | 74/493 |
| 5,143,402 | 9/1992 | Higashino et al. . | |
| 5,144,855 | * 9/1992 | Yamaguchi et al. | 74/493 |
| 5,328,241 | * 7/1994 | Haider | 74/577 M |
| 5,452,624 | 9/1995 | Thomas et al. | 74/493 |
| 5,820,163 | * 10/1998 | Thacker et al. | 74/493 |
| 5,823,062 | * 10/1998 | Snell et al. | 74/493 |

FOREIGN PATENT DOCUMENTS

| 0 818 379 | 1/1998 | (EP) . |
| 2 312 272 | 10/1997 | (GB) . |
| 2-34145 | 9/1990 | (JP) . |

* cited by examiner

Primary Examiner—David A. Bucci
Assistant Examiner—William C Joyce
(74) Attorney, Agent, or Firm—Miles & Stockbridge P.C.

(57) ABSTRACT

A tilt lock mechanism of a tilt adjusting type steering apparatus comprises a fixed gear mounted on one of a lower column member and an upper column member, a movable gear supported to be freely rockable by the other of the lower column member and the upper column member to be detachably engaged with the fixed gear, a reaction force member disposed in the vicinity of the back surface of the movable gear, and a wedge member to take a lock position at which it is inserted between the reaction force member and the back surface of the movable gear to cause the movable gear to mesh with the fixed gear and a release position at which it is retracted from the lock position to release the movable gear from the fixed gear.

13 Claims, 28 Drawing Sheets

FIG. 25
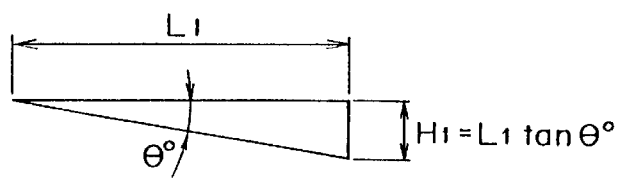
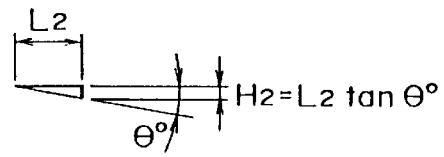
$\theta$ : ANGLE OF DEVIATION OF PARALLELISM
$L_1$ : WHOLE WIDTH OF FIXED GEAR
$L_2$ : WIDTH OF MESHED PORTION OF THE INVENTIVE TEETH
$H_1$ : DEVIATION AMOUNT OF PRIOR ART TOOTH STRUCTURE
$H_2$ : DEVIATION AMOUNT OF MESHED PORTION OF THE INVENTIVE TEETH

STATE OF MESH OF THE PRIOR ART TEETH

MESHED STATE OF THE INVENTIVE TEETH

TILT ADJUSTING-TYPE STEERING APPARATUS

This application claims the benefits of Japanese Application Nos. 9-311027, 9-327174, 10-021613, 10093857 and 10-231124, which are hereby incorporated by reference.

BACKGROUND OF THE INVENTION

1. Field of the Invention

The present invention relates to a tilt adjusting-type steering apparatus which is provided with a tilt adjusting mechanism for adjusting the height of a steering wheel in a car or other vehicles in accordance with the physical dimensions of the driver.

2. Related Background Art

As a steering apparatus to be mounted on a car or other vehicles, there is conventionally known a tilt adjusting-type steering apparatus in which the height of the steering wheel can be adjusted in accordance with the physical dimensions of the driver. The adjustment of the height of the steering wheel in this tilt adjusting-type steering apparatus is generally performed by releasing a lock so that an upper column member can be move to change its inclination with respect to a lower column member, so as to thereby set the height of the steering wheel to a desired position value, and then locking the upper column member with respect to the lower column member. A mechanism for locking the upper column member and releasing this lock in this case is a tilt lock mechanism.

An example of the tilt lock mechanism is disclosed in Japanese Utility Model Publication No. 2-34145, which is illustrated in FIGS. 30 and 31.

In the tilt adjusting-type steering apparatus shown in these drawings, a lower column 52 for supporting a lower steering shaft 51 to be rotatable is fixed to the car body (not shown) through a bracket 53. An upper column 55 for supporting an upper steering shaft 54 to be rotatable is supported by the bracket 53 to allow free tilting movement with tilt shafts 56, 57 as the center thereof. A steering wheel (not shown) is attached to the upper steering shaft 54. A gear portion 58 fixed on the side of the upper column 55 is caused to mesh with a movable gear member 59 which is supported to freely oscillate by the bracket 53, and the movable gear member 59 is pressed from the back thereof by the tilt lock mechanism to effect locking. The tilt lock mechanism comprises right and left support hangers 60, 61 with their upper ends respectively supported to freely oscillate by the tilt pivots or shafts 56, 57, a roller support shaft 62 fixed to the lower ends of these support hangers 60, 61, and a roller 63 supported to freely rotate by the roller support shaft 62. The roller support shaft 62 is formed with a tilt lever 64 as a unitary structure and arranged so that the roller 63 can be moved in a right and left direction (in FIG. 30) by operating the tilt lever 64.

The movable gear member 59 is locked and is released from the lock by means of the tilt lock mechanism having the above-mentioned structure in the following manner. When the tilt lever 64 in its locked state in FIG. 30 is rotated in a counter-clockwise direction in the same drawing against a biasing force of a spring 65, the roller 63 is moved to the right about the tilt pivots 56, 57 to be retracted from a taper portion 66 of the movable gear member 59, whereby the movable gear member 59 is released from the fixed gear 58. In this released state, the upper column 55 is moved to change its inclination with respect to the bracket 53 so as to set the steering wheel at a proper position. After that, when the tilt lever 64 is released, the roller 63 is moved to the left by the biasing force of the spring 65 so as to press the taper portion 66, whereby the movable gear member 59 is meshed with the fixed gear 58 to be locked. Upon this locking, the adjustment of the height of the steering wheel is completed.

In the above-mentioned tilt adjusting-type steering apparatus, the roller 63 of the tilt lock mechanism is protruded downward, so the roller 63 is positioned around the knees of the driver. As a result, there is a risk that the driver's knees may be hit by the roller 63 during driving, or that the lock of the movable gear member 59 may be released.

In order to prevent such accident, it is possible to cover the roller 63 with a lid or cover. However, with this arrangement, the number of constituent parts is increased so as to further narrow a space around the knees of the driver disadvantageously.

SUMMARY OF THE INVENTION

Accordingly, an object of the present invention is to provide a tilt adjusting-type steering apparatus which prevents the driver's knees from being hit during driving without increasing the number of the constituent parts or narrowing the space around the driver's knees, and to prevent the lock from being released as a result.

In order to achieve the above object, there is provided according to the present invention a tilt adjusting-type steering apparatus in which a lower steering shaft provided with a steering gear at the lower end thereof and an upper steering shaft provided with a steering wheel at the upper end thereof are coupled with each other by a universal joint, a lower column member for supporting the lower steering shaft to be rotatable is fixed to the body of a car, an upper column member for supporting the upper steering shaft to be rotatable is supported to be freely rockable in a vertical plane by a tilt adjusting shaft mounted on the lower column member to pass through the center of said universal joint, and the upper column member is locked with respect to the lower column member by means of a tilt lock mechanism, characterized in that:

the tilt lock mechanism comprises a fixed gear mounted on one of the lower column member and the upper column member, a movable gear supported to be freely rockable by the other of the lower column member and the upper column member to be detachably engaged with the fixed gear, a reaction force member disposed in the vicinity of the back surface of the movable gear, and a wedge member to take a lock position at which it is inserted between the reaction force member and the back surface of the movable gear to bring the movable gear into engagement or mesh with the fixed gear and a release position at which it is retracted from the lock position to release the movable gear from the fixed gear.

According to the invention, it is possible to insert or retracted the wedge member into or from a space between the reaction force member and the back surface of the movable gear so as to bring the movable gear into engagement with the fixed gear to be locked, and it is also possible to release the movable gear from the fixed gear. Further, the wedge member is covered with the reaction force member while it is disposed at the lock position so that there is no need to provide, for example, a special cover for that, and there is no possibility that the driver's knees are hit by this wedge member to release the lock of the movable gear to the fixed gear.

The tilt adjusting-type steering apparatus of the present invention can be arranged such that the fixed gear has a plurality of teeth extended in the lateral direction and formed on an outer peripheral surface of said one of the lower column member and the upper column member, while the movable gear comprises a pin inserted through the support portions formed on the other of the above-mentioned outer peripheral surfaces in parallel to the tilt shaft, a movable gear main body having a through hole to pass the pin at the base end thereof and a plurality of teeth capable of meshing with the teeth of the fixed gear at the tip end thereof, and a bush interposed between the outer peripheral surface of the pin and the inner peripheral surface of the through hole, and special form portions into which a part of the bush is thrust when a force in a direction of twisting the movable gear main body is caused to work due to the mesh between the of the fixed gear teeth and the teeth of the movable gear are formed on one of the outer peripheral surface of the pin and the inner peripheral surface of the through hole.

Since it is possible for a part of the bush to be thrust into the special form portion according to the tilt adjusting-type steering apparatus having such structure, the movable gear main body can be rotated to that extent in the twisting direction around the vicinity of the bush. As a result, when the movable gear main body is caused to rock to make the teeth thereof mesh with the teeth of the fixed gear in a state where the degree of parallelism between the teeth of the fixed gear and the teeth of the movable gear main body is not sufficient after completion of assembly, the teeth of the fixed gear and the teeth of the movable gear are meshed with each other with precision and the movable gear main body is rotated in the twisting direction correspondingly. That is, as the part of the bush is thrust into the special form portion, the movable gear main body is rotated in accordance with the meshed state between the teeth of the movable gear and the teeth of the fixed gear. As a result, an excellent meshed state with a high degree of parallelism can be realized between the teeth of the fixed gear and the teeth of the movable gear in the opposite way.

Furthermore, the tilt adjusting-type steering apparatus of the present invention can be arranged such that the fixed gear is cast either in a lower bracket or an upper bracket. With this structure, since the fixed gear is cast either in the lower bracket or the upper bracket, it is no longer necessary to employ a method for fixing the fixed gear by welding or by use of a caulking pin or a bolt and a nut, unlike in a conventional structure. As a result, a troublesome installing step of the fixed gear can be saved and the number of assembling steps and that of the constituent parts can be reduced, whereby the manufacturing cost can be decreased. Moreover, since the fixed gear is cast in the bracket, it can be located precisely and secured for a long time.

Further, the tilt adjusting-type steering apparatus of the present invention can be arranged such that at least a part of the teeth in the width direction out of at least one of the teeth of the movable gear and the teeth of the fixed gear are formed in accordance with the regular gear specifications, and the remaining teeth are formed to generate a predetermined clearance with the teeth of the other gear. With this structure, at least a part of the teeth in the face width direction of at least one of the teeth of the movable gear and the teeth of the fixed gear are formed in accordance with the regular gear specifications, and the remaining teeth are formed to generate a predetermined clearance with the teeth of the other gear. As a result, if at least a part of the teeth in the width direction out of the teeth formed in accordance with the regular gear specifications of one of the engagement members are meshed with the teeth of the other of the engagement members in a normal use, a mesh with a sufficient strength can be realized even when the parallelism of the both teeth is slightly divergent because a load applied on each tooth is small, thereby generating no backlash. Also, as in the case of collision, if the steering apparatus receives an excessive load input, the remaining teeth which are arranged to have a predetermined clearance with the teeth of the other gear can be meshed with the teeth of the other gear so that a mesh with a sufficient strength can be realized and the steering apparatus can endure the excessive load satisfactorily. Further, it is no longer necessary to maintain a remarkably high processing accuracy, unlike in the conventional apparatus, and it is also no longer required to fix the engagement members by welding or a bolt and a nut in a state where the teeth of the both members are meshed with each other. As a result, the manufacturing cost can be reduced, the number of the constituent parts can be decreased, and the weight of the steering apparatus can be lightened.

BRIEF DESCRIPTION OF THE DRAWINGS

FIG. 21 is a plan view of the movable gear, while

FIG. 25 is a vector diagram for showing amount of deviation of the movable gear (the engagement member on the movable side) and the fixed gear.

DESCRIPTION OF THE PREFERRED EMBODIMENTS

An embodiment of the present invention will be described below with reference to the drawings.
(First Embodiment)

Figure 1:
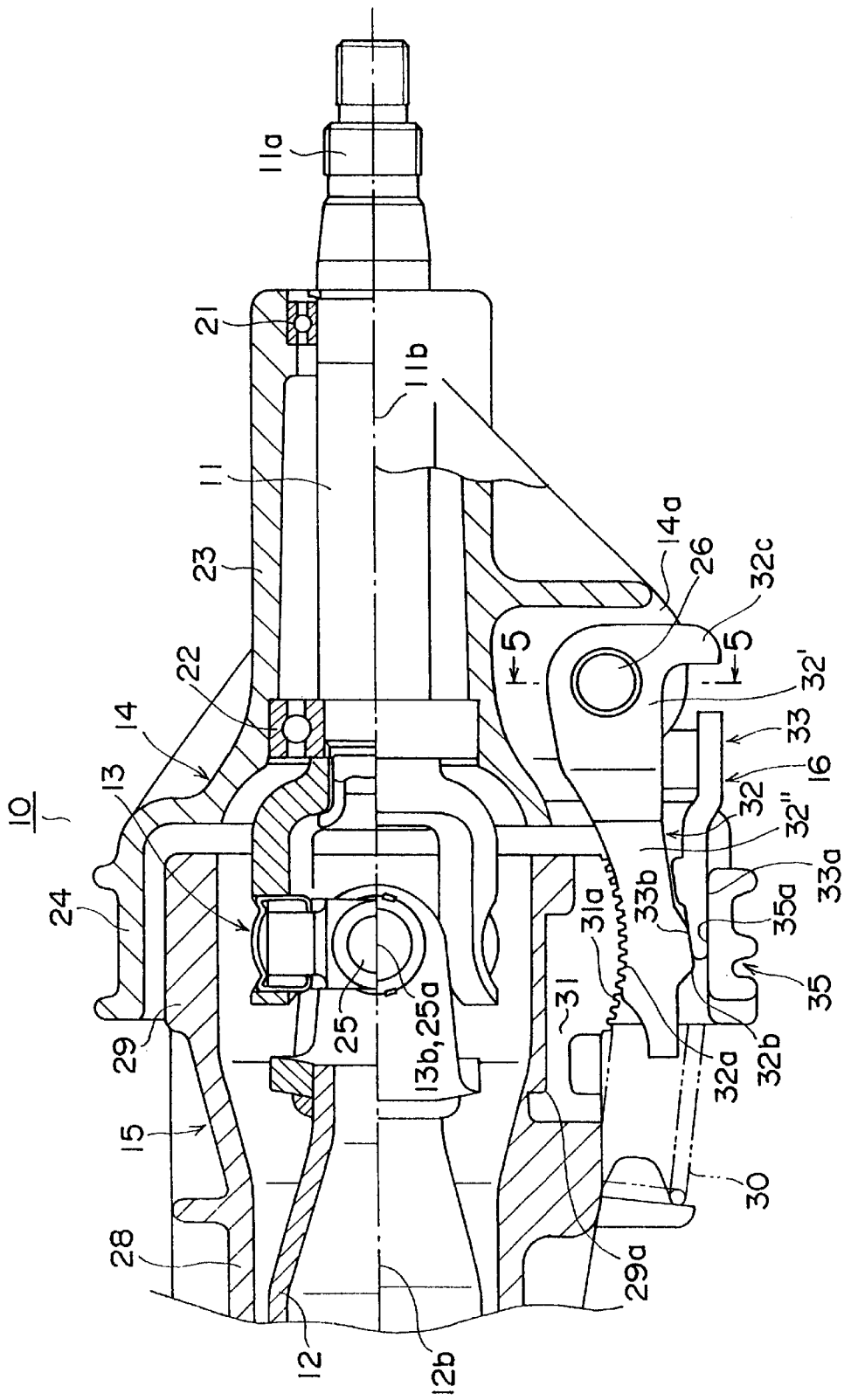
FIG. 1 is a longitudinal cross-sectional view of a tilt adjusting-type steering apparatus according to a first embodiment of the invention.
Figure 2:
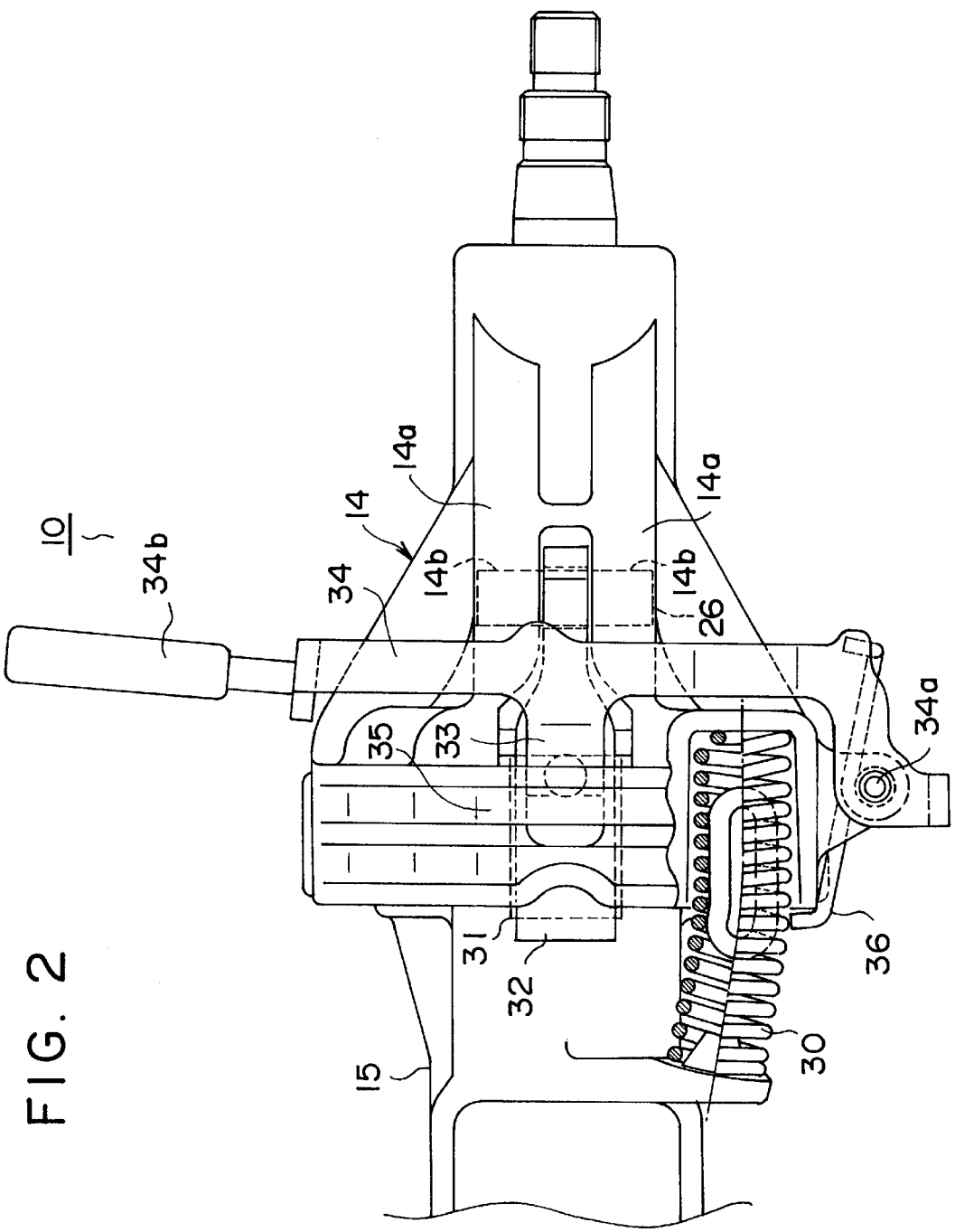
FIG. 2 is a bottom plan view of the tilt adjusting-type steering apparatus according to the first embodiment of the invention.
Figure 3:
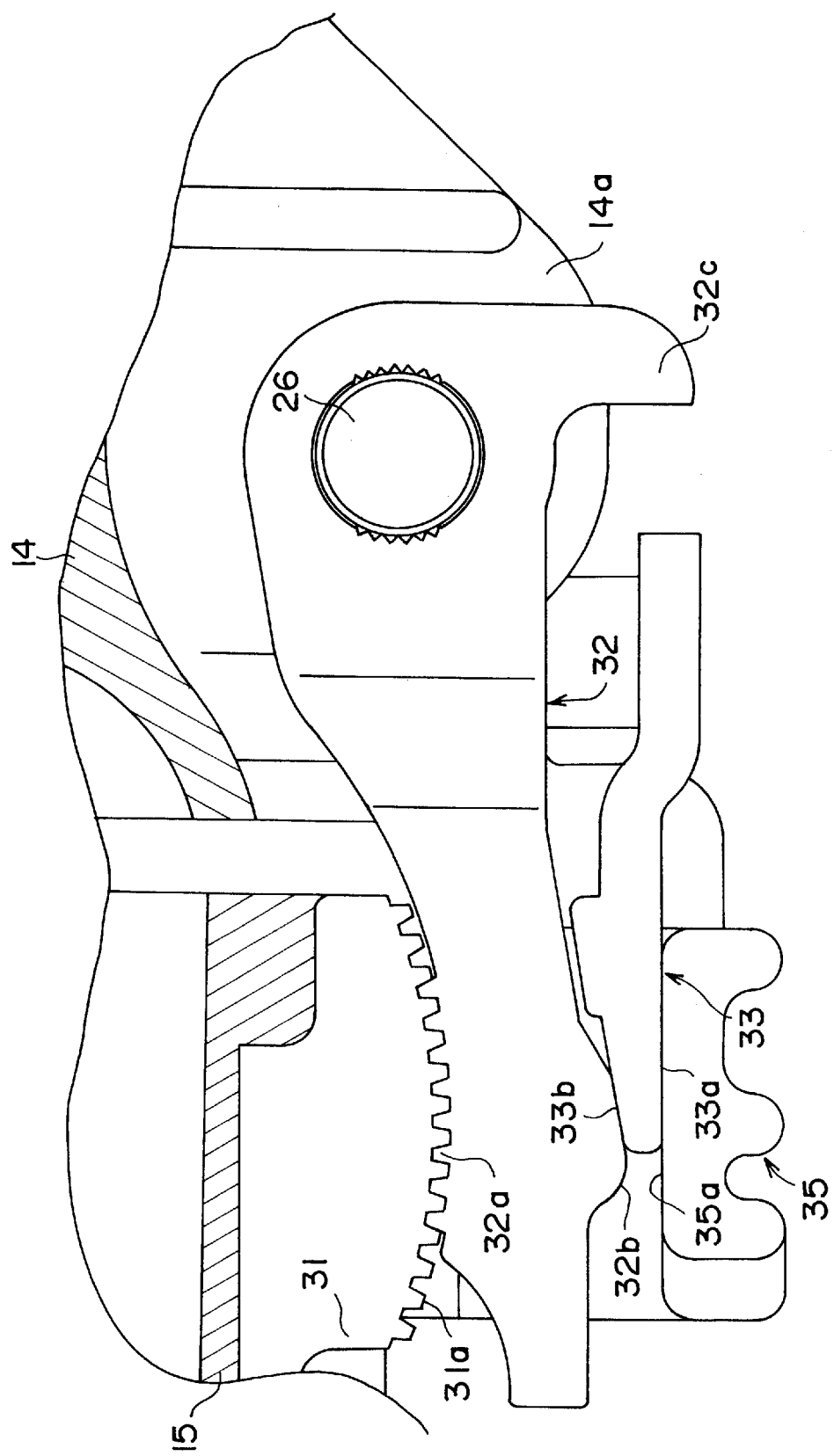
FIG. 3 is an enlarged view of a wedge member disposed at a lock option according to the first embodiment.
Figure 4:
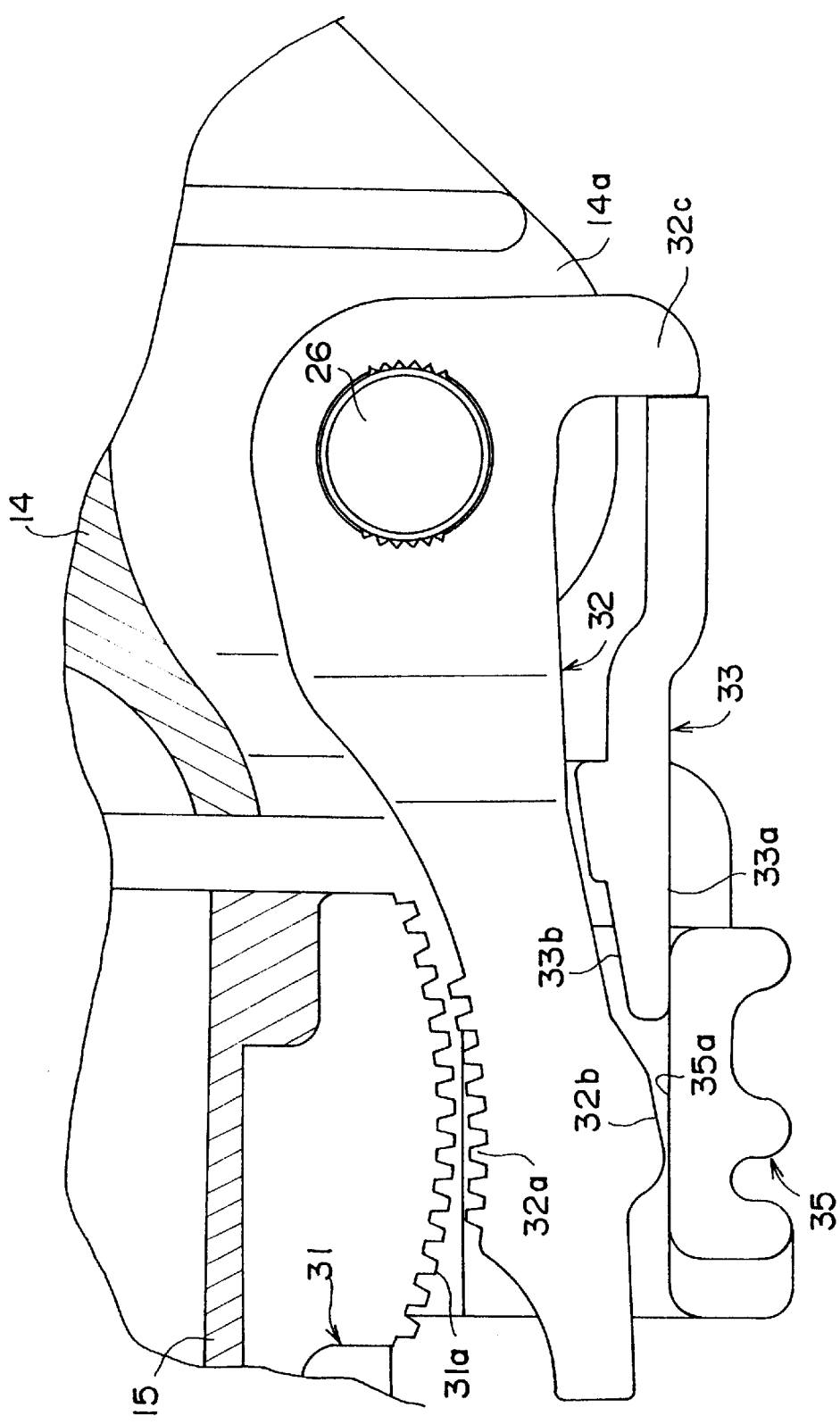
FIG. 4 is an enlarged view of the wedge member disposed at a release position.
Figure 5:
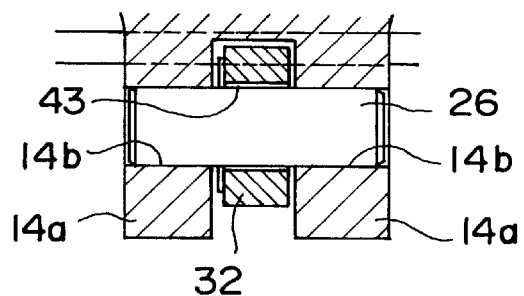
FIG. 5 is a view of the steering apparatus of FIG. 1, taken along the line 5—5.

An embodiment of a tilt adjusting-type steering apparatus according to the present invention is shown in FIGS. 1, 2, 3 and 4. FIG. 1 is a longitudinal cross-sectional view, and FIG. 2 is a bottom plan view of the tilt adjusting-type steering apparatus, while FIG. 3 is a view for showing a state in which a movable gear 32 (which is described later) is disposed at a lock position. FIG. 4 is a view for showing a movable gear 32 disposed at a release position. The vertical and horizontal directions in the following description are determined from the position of the driver who operates the steering wheel. More specifically, the right part in FIG. 1 is determined as the "above", the left part as the "below", the upper part as the "front", and the lower part as the "behind". Further, in FIG. 2, the upper part is determined as the "left", and the lower part as the "right". The term "lock" is used both for the movable gear 32 and an upper column member 14 (which is described later). That is, this term is used such that the movable gear 32 is locked with a fixed gear 31 (which is described later), or that the upper column member 14 is locked with a lower column member 15 (which is described later).

The tilt adjusting-type steering apparatus 10 shown in these drawings is attached to vehicles such as a car to transmit a rotation of a steering wheel (not shown) to the wheels (not shown). The apparatus 10 is comprised of an upper steering shaft 11, a lower steering shaft 12, a universal joint 13, the upper column member 14, the lower column member 15 and the tilt lock mechanism 16 as its main constituent members. Description will be made on these members in the named order.

The upper steering shaft 11 is provided with a steering wheel mounting portion 11a at the upper end thereof (in the right part in FIG. 1), and a steering wheel (not shown) is attached to this wheel mounting portion 11a. The upper steering shaft 11 is also provided with a universal joint 13 at the lower end thereof. Bearings 21, 22 are interposed between the upper column member 14 and the upper part and the lower part of the steering shaft 11, respectively.

A steering gear (not shown) is fixed to the lower end of the lower steering shaft 12 (in the left part in FIG. 1). For example, in a rack and pinion type steering apparatus, a steering gear is meshed with a steering rack, and the steering rack is coupled to the wheels through a tie rod, a ball joint, a knuckle arm, etc. The above-mentioned universal joint 13 is coupled to the upper end of the lower steering shaft 12. The lower steering shaft 12 is supported to be rotatable by bearings (not shown) which are interposed between the lower steering shaft 12 and the lower column member 15.

The universal joint 13 is interposed, as described above, between the lower end of the upper steering shaft 11 and the upper end of the lower steering shaft 12 so as to couple the both steering shafts 11, 12 together to be flexible. With the interposition of this universal joint 13, whenever the axial center 11b of the upper steering shaft 11 is not in alignment with the axial center 12b of the lower steering shaft 12, that is, whenever the axial center (i.e., center axis) 11b of the upper steering shaft 11 is inclined with respect to the axial center (i.e. center axis) 12b of the lower steering shaft 12, a rotation of the upper steering shaft 11 caused by a rotation of the steering wheel is smoothly transmitted to the lower steering shaft 12 through the universal joint 13. In this case, if the axial center 11b of the upper steering shaft 11 is inclined with respect to the axial center 12b of the lower steering shaft 12, a straight line which makes a right angle with a plane formed by these two axial centers 12b, 11b and passes a point at which extensions of the two axial centers 12b, 11b are crossing each other is determined as the center 13b of the universal joint 13. With such determination, the axial centers 25a, 25a of tilt shafts 25, 25 coincides with this center 13b of the universal joint 13.

The upper column member 14 is comprised of a cylindrical column main body 23 and an upper bracket portion 24 fixed to the lower end of the column main body 23 as a unitary integral structure. The upper bracket portion 24 is formed in a U shape which is opened downward to cover most of the above-mentioned universal joint 13. Right and left through holes (not shown) are respectively formed on the right and left sides of the lower end of the upper bracket portion 24, and the tip ends of the tilt shafts 25, 25 are inserted into these through holes via bushes (not shown). The axial centers 25a, 25a of these tilt shafts 25, 25 are passed through the center 13b of the universal joint 13. Support portions 14a, 14a are formed in the hind portion on the outer peripheral surface of the upper column member 14 (in the lower part in FIG. 1). Through holes 14b, 14b which are in parallel to the axial centers 25a, 25a of the tilt shafts 25, 25 are formed on these support portions 14a, 14a. A pin 26 for supporting a movable gear 32 which is described later to rock freely are inserted into these through holes 14b, 14b. It should be noted that this pin 26 constitutes a part of the tilt lock mechanism 16 which is described later. The upper column member 14 supports the upper steering shaft 11 to be rotatable by means of the above-mentioned bearings 21, 22 which are interposed between the upper end of the column main body 23 and the upper steering shaft 11, and between the upper end of the upper bracket portion 24 and the upper steering shaft 11, respectively, and is supported to be tiltable (to be freely rockable) by the lower column member 15 which is described next, by means of the tilt adjustment shafts or pivots 25, 25.

The lower column member 15 has a column main body 28 and a cylindrical portion 29 formed integrally with the column main body. The cylindrical portion 29 has a support portion (not shown) which is formed to be sandwiched from right and left by the above-mentioned upper bracket portion 24. The tip ends of the tilt adjustment shafts 25, 25 are inserted into these support portions. The column main body 28 is fixed to an installment panel (not shown) of the car body through a mounting portion (not shown). The lower column member 15 supports the lower steering shaft 12 to be rotatable through bearings (not shown) and supports the upper column member 14 to freely rockable by means of the tilt adjustment shafts 25, 25. A compression spring 30 is interposed between the lower column member 15 and the upper column member 14, as shown in the lower part of FIG. 1 and in the lower part of FIG. 2, whereby the upper column member 14 is biased against the lower column member 15 upward (in the counter-clockwise direction in FIG. 1) with the tilt adjustment shafts 25, 25 as the centers thereof. The biasing force of this compression spring 30 is set to offset the weights of the upper steering shaft 11, the upper column member 14, the steering wheel, etc., so that it is possible to easily adjust the height of the steering wheel.

The tilt lock mechanism 16 is comprised of the above-mentioned pin 26, a fixed gear 31 which is provided on the side of the lower column member 15, the movable gear 32 which is provided on the side of the upper column member 14, a wedge member 33, an operation arm 34 having this wedge member 33, and a reaction force member 35, as the main constituent members thereof.

The above-mentioned constituent members from the fixed gear 31 to the reaction force member 35 will be fully described below in the named order.

The fixed gear 31 is a block-like member which is fixed to the hind surface (a lower part in FIG. 1) 29a on the outer peripheral surface of the cylindrical portion 29, and is provided with a lot of teeth 31a toward the rear direction. These teeth 31a of the fixed gear are formed such that the teeth are extended in a right and left direction or a transverse direction to the axial direction of the steering shaft 11 or 12, and the teeth surfaces are arranged to form a circular arc about the tilt adjustment shafts 25, 25.

The movable gear 32 is comprised of a base end portion 32', and a main body 32", and this base end portion 32' is supported to be rockable by the pin 26 which is inserted into the support portions 14a, 14a of the above-mentioned upper column member 14. The movable gear main body 32" is formed of a plate member and is provided with a lot of teeth 32a which can be meshed with the fixed teeth 31a, on the front surface of the tip end side thereof. A taper surface 32b is formed on the reverse side to the teeth 32a of the movable gear 32. A protrusion 32c is formed backward on the base end side of the movable gear 32. This protrusion 32c is arranged to separate the teeth 32a of the movable gear 32 from the teeth 31a of the fixed gear 31 by forcibly pressing the tip end of the movable gear 32 down in FIG. 1 when the upper end of the operation arm 34 which is described later is brought into contact with this protrusion 32c.

The wedge member 33 is formed to protrude downward (in FIG. 1, which is leftward in FIG. 2) at the central part of the operation arm 34 in the lateral direction, which is elongated in the lateral direction. At the tip end side of the wedge member 33, there is provided an inclined surface 33b having an angle θ of inclination of with respect to a reference surface 33a on the back surface side which is in contact with the reaction force member 35 described later. The reference surface 33a and the inclined surface 33b constitute a thin tapered wedge portion. The angle θ of inclination of the inclined surface 33b is set to correspond to the taper surface 32b of the movable gear 32, that is, to satisfy the relation that tan θ<α where the maximum coefficient of friction between the taper surface 32b and the inclined surface 33b is α. For this reason, the wedge member 33 is not moved from the lock position shown in FIG. 3 to the right in the same drawing when, for example, a force in a drawing direction (to the right in FIG. 3) is caused to act from the side of the movable gear 32. If the angle of inclination does not satisfy the relation of tan θ<α, it is possible to prevent the wedge member 33 from moving in the drawing direction (to the right in FIG. 3) by means of a biasing force of a spring 36 which is described later.

The operation arm 34 has the above-mentioned wedge member 33 at its central part in the lateral direction, and the center of rocking movement 34a at its base end side. An operation lever 34b is fixed to the tip end of the operation arm 34. The center 34a of the rocking movement is oriented to a direction perpendicular to a plane including the axial center 11b of the upper steering shaft 11 and the axis 25a of the tilt adjustment shaft or pivot 25, and the operation arm 34 conducts a swinging operation on a plane parallel to this plane including the axial center 11b and the axis 25a. The operation arm 34 is biased in the counter-clockwise direction in FIG. 2 by means of a wire spring 36 which is provided in the vicinity of the center 34a of the rocking movement. With this biasing, the wedge member 33 takes the lock position shown in FIG. 3, that is, the position at which it is inserted between the taper surface 32b and the reaction force member 35. The release position is shown in FIG. 4, that is, the position at which the wedge member is retracted from the lock position by the clockwise operation of the operation lever 34b shown in FIG. 2.

The reaction force member 35 is formed in the vicinity of the taper surface 32b of the movable gear 32 in FIG. 1 and FIG. 3 as a part of the upper bracket portion 24 of the upper column member 14. A surface of the reaction force member 35 opposed to the taper surface 32b is a pressurization surface 35a. The wedge member 33 is inserted between this pressurization surface 35a and the taper surface 32b to take the lock position, whereby the teeth 32a of the movable gear 32 are meshed with the teeth 31a of the fixed gear 31 to be locked.

Figure 6:
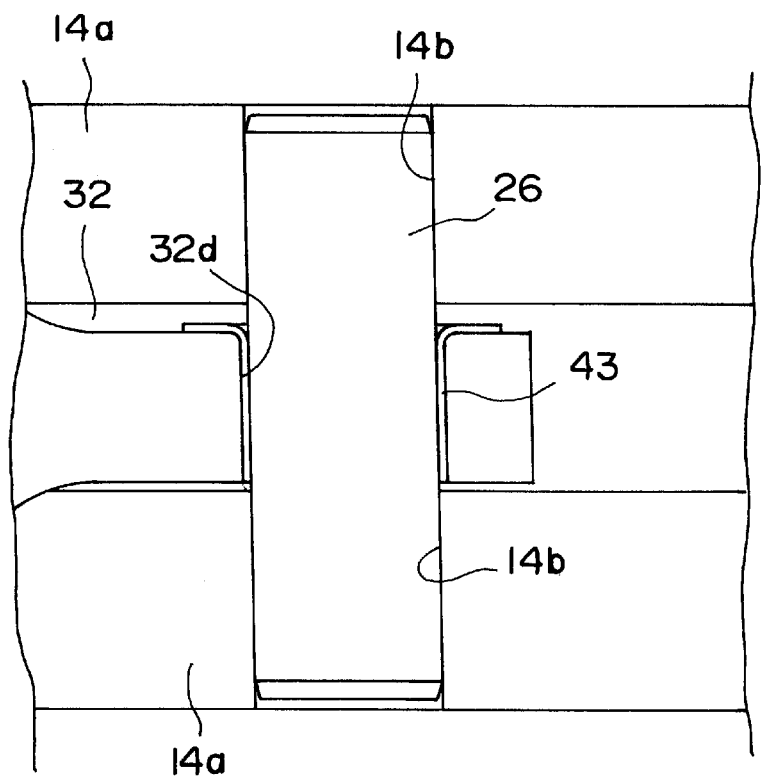
FIG. 6 is an enlarged view of a base end portion of a movable gear according to the first embodiment.
Figure 7:
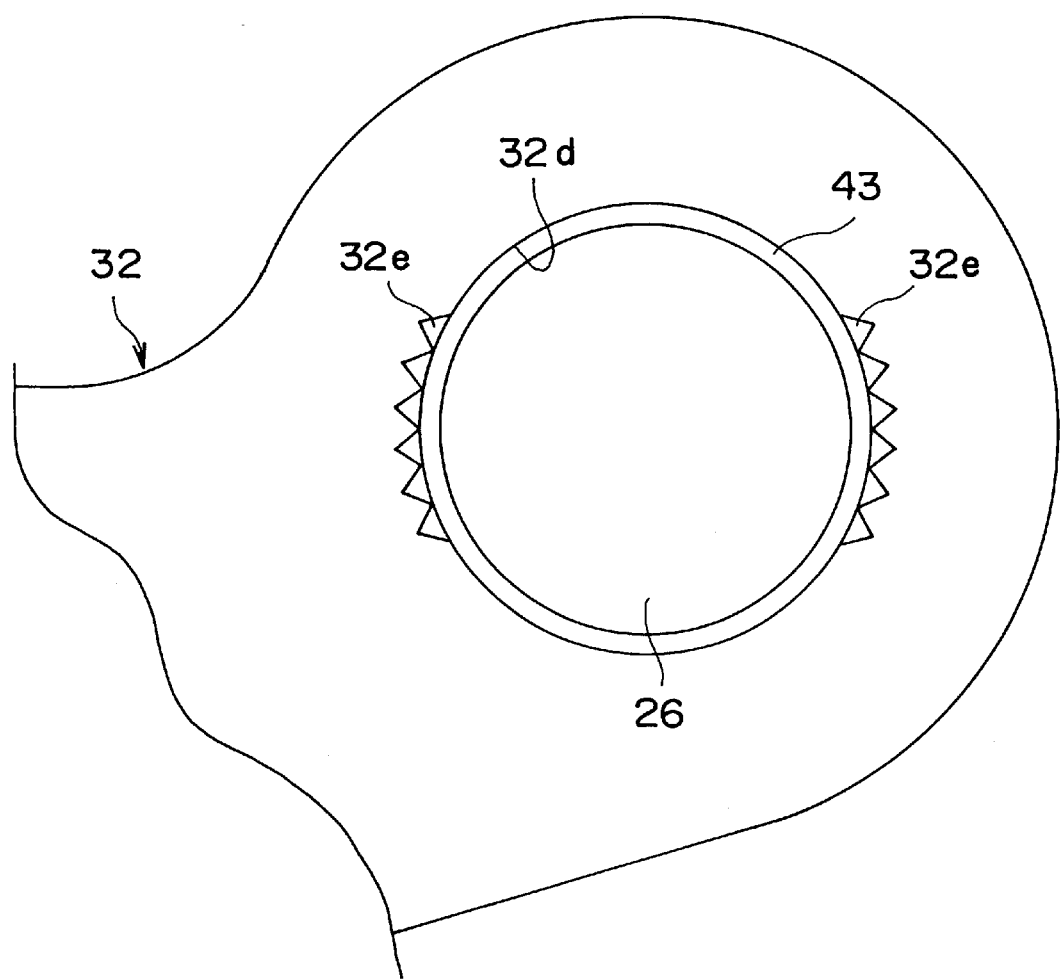
FIG. 7 is a view for showing the form of a special form portion of the movable gear according to the first embodiment.
Figure 8:
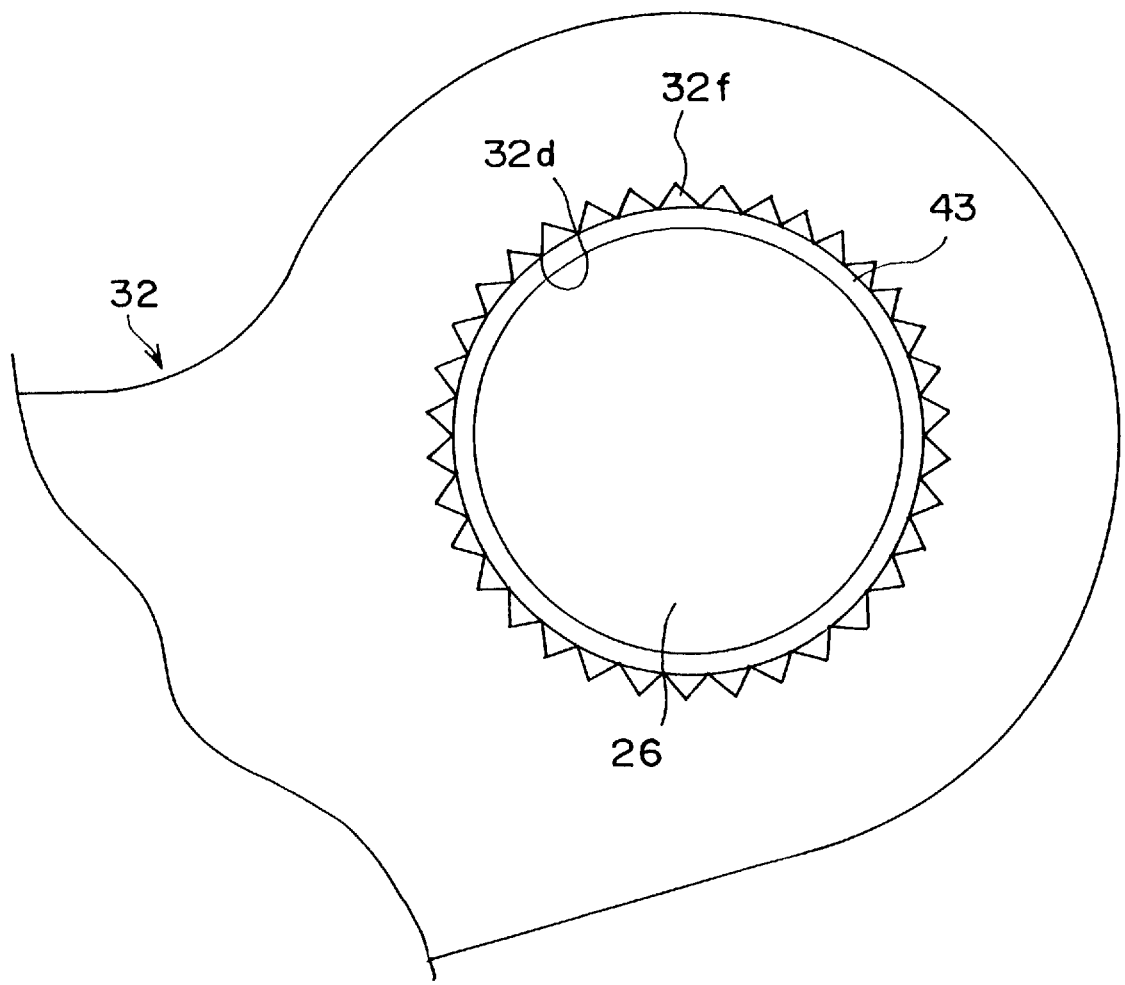
FIG. 8 is a view for showing another form of the special form Portion the movable gear according to the first embodiment.

As shown in FIG. 6 which is an enlarged view of a part in FIG. 2, a through hole 32d is formed in the lateral direction at the base end of the movable gear main body 32. A flanged bush 43 is inserted in the inner peripheral surface of this through hole 32d, and the pin 26 which is inserted into the support portions 14a, 14a of the upper column member 14 is inserted in the inner peripheral surface of the bush 43. The special form portions 32e, 32e are formed on the inner peripheral surface of the through hole 32b, as shown in FIG. 7. These special form portions 32e, 32e are formed of a plurality of saw-toothed protuberances, and are formed in parts, i.e., upper and lower parts on the inner peripheral surface of the through hole 32d. These special form portions 32e, 32e are arranged to be thrust by the bush 43 when a force in the direction of twisting the movable gear 32 is caused to act on the movable gear 32. More specifically, when a lateral force is caused to act on the teeth 32a at the tip end of the movable gear 32, the special form portions 32e, 32e are thrust into the outer peripheral surface of the bush 43, thereby allowing the tip end a slight movement in the lateral direction. As a result, the teeth 32a are arranged to be meshed with the fixed teeth 31a with precision so as to remove a tilt backlash of the upper column member 14 with respect to the lower column member 1. This arrangement will be described later again. The special form portions 32e, 32e may be formed in part of the inner peripheral surface of the through hole 32d, as shown in FIG. 7, or may be provided over the entire inner peripheral surface of the through hole 32d, as indicated by a referential numeral 32f in FIG. 8. In addition, the special form portions 32e, 32e may be formed on the outer peripheral surface of the pin 26, instead of on the inner peripheral surface of the through hole 32d, though this is not shown in the drawing.

Next, description will be made on an operation of the tilt adjusting-type steering apparatus 10 having the above-mentioned structure.

In order to adjust the height of the steering wheel, first the lock of the movable gear 32 by the wedge member 33 is released. When the operation lever 34b is drawn in the clockwise direction in FIG. 2 to overcome the biasing force of the spring 36, the whole operation arm 34 is rotated in the clockwise direction around the center 34a of the rocking movement. With this rotation of the operation arm 34, the wedge member 33 is moved to the right in FIG. 3, and is drawn out of the space between the taper surface 32b of the movable gear 32 and the pressurization surface 35a of the reaction force member 35. When the wedge member 33 is further moved to the right, the hind end thereof is brought into contact with the protrusion 32c of the movable gear 32, as shown in FIG. 4, and the movable gear 32 is caused to rock downward in FIG. 4 with the pin 26 as the center of the rocking movement, whereby the lock and the mesh of the teeth 32a of the movable gear 32 on the side of the upper column member 14 with the teeth 31a of the fixed gear 31 on the side of the lower column member 15 are released. When the taper surface 32b of the movable gear 32 is brought into contact with the pressurization surface 35a of the reaction force member 35, the rocking movement of the movable gear 32 is stopped, thereby stopping a rightward movement of the wedge member 33 by means of the protrusion 32c of the movable gear 32. In this state, the wedge member 33 is disposed at the release position shown in FIG. 4. When the wedge member 33 is disposed at the release position in this manner, the upper column member 14 can be inclined with respect to the lower column member 15, whereby it becomes possible to adjust the height of the steering wheel.

After the steering wheel is adjusted to be at an appropriate height, the operation lever 34b is released. Then, the operation arm 34 is rotated in the counter-clockwise direction in FIG. 2 by the biasing force of the spring 36, and the wedge member 33 is moved to the left from the position in FIG. 4 to the position in FIG. 3. The wedge member 33 is moved to the left in such a manner that the reference surface 33a thereof slides on the pressurization surface 35a of the reaction force member 35, so that the taper surface 32b of the movable gear 32 is pushed upward in FIG. 3 by means of the inclined surface 33b. In this manner, the teeth 32a of the movable gear 32 are meshed with the teeth 31a of the fixed gear 31 to be locked. Thus, the upper column member 14 is locked with respect to the lower column member 15 to thereby complete the height adjustment of the steering wheel.

Figure 30:
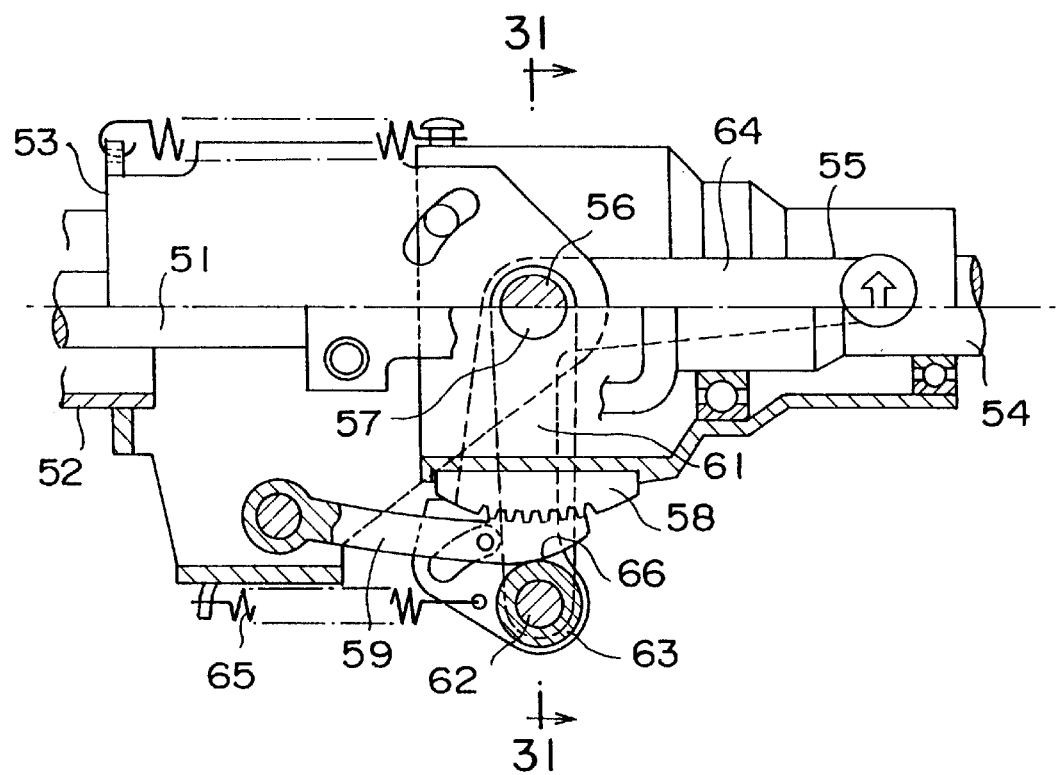
FIG. 30 is a longitudinal cross-sectional view of a conventional tilt adjusting-type steering apparatus.
Figure 31:
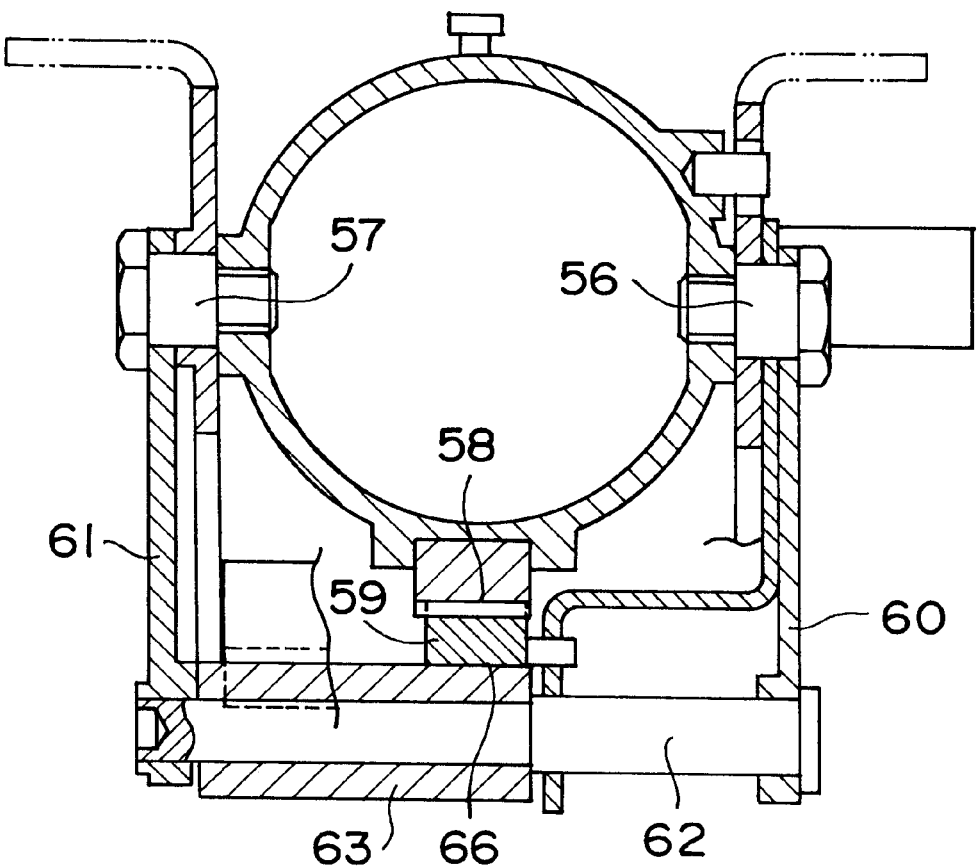
FIG. 31 is a view of the steering apparatus of FIG. 30, taken along the line 31—31.

In the tilt adjusting-type steering apparatus 10 with the above-mentioned structure and operation, the wedge member 33 of the tilt lock mechanism 16 can be made thin to have a small thickness (the vertical size in FIGS. 1, 3 and 4). Since the wedge member 33 is covered with the reaction force member 35, the steering apparatus 10 does not hit the driver's knees, and therefore, there is no possibility of releasing the lock of the movable gear 32 by such hitting. The above description that the wedge member 33 is made to be thin simply means that the size of the wedge member can be set smaller compared to the diameter of a roller 63 of the prior art (see FIG. 30).

According to the first embodiment of the present invention, a tilt backlash of the upper column member 14 with respect to the lower column member 15 can be prevented. That is, as shown in FIG. 7, the special form portions 32e, 32e are formed on the through hole 32d at the base end of the movable gear 32, and when a force is caused to act in a direction of twisting the movable teeth 32a at the tip end of the movable gear 32, the special form portions 32e, 32e are arranged to be thrust into a part of the bush 43. As a result, if, for example, the fixed teeth 31a and the movable teeth 32a are meshed with each other in a state in which the degree of parallelism is not sufficient, the teeth 32a are first slightly moved to the teeth 31a of the fixed gear to be engaged therewith properly, and then, the special form portions 32e, 32e are thrust into the bush 43 correspondingly. As a result, no backlash is generated between the teeth 31a of the fixed gear and the teeth 32a of the movable gear, and no tilt backlash is brought about between the lower column member 15 and the upper column member 14.

Figure 9:
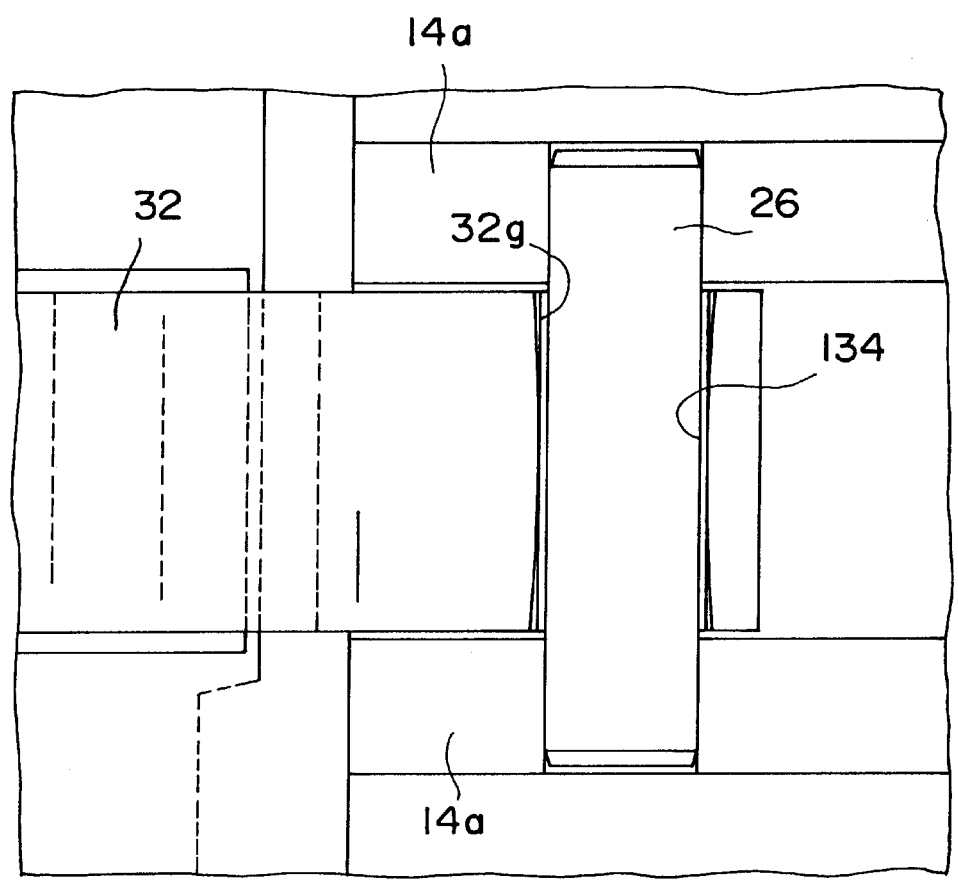
FIG. 9 is an enlarged view of the base end portion of the movable gear according to a variation of the first embodiment.

According to a variation of the first embodiment, as shown in FIG. 9, the through hole 32g on the base end side of the movable gear main body 32 has a cross section formed of inwardly convex surface portions. That is, the inner diameter of the inner peripheral surface of the through hole 32g is the minimum at the center thereof in the axial direction and gradually increases as it goes outward. In this manner, the teeth at the tip end of the movable gear main body 32 can rock in the lateral direction about the center of this through hole, thereby facilitating a proper mesh between the teeth of the fixed gear and the teeth of the movable gear.

Also, the same structure as that of the vicinity of the through hole 32d of the movable gear main body 32 of the first embodiment may be applied to the vicinity above-mentioned through hole (not shown) of the upper bracket 24 to which the tilt shaft 25 is inserted. That is, the special form portions may be formed on the inner peripheral surfaces of through holes for the tilt shaft 25 and the bush may be interposed between this inner peripheral surface and the outer peripheral surface of the tip end of the tilt shaft 25.

Generally, the concentricity of the through holes for the tilt adjustment shafts which are formed at the right and left sides of the upper bracket 24 and the concentricity of two though holes for the same tilt adjustment shafts which are formed at the right and left sides of the lower bracket 29 are essential. If these concentricities deviate, a slow tilt adjusting operation or other operational problems will occur.

Accordingly, in the present embodiment, it is arranged, as described above, to provide the special form portions and the bush, so that even if any of the concentricities between the through holes of the upper bracket and the through holes 29d of the lower bracket slightly deviates, the same effects as if the deviating concentricity has been corrected can be obtained since the special form portions are thrust into the bush and a smooth tilt operation can be conducted.

As described above, according to the present embodiment, one of the lower column member and the upper column member is provided with a fixed gear, while the other is provided with a movable gear to be meshed with this fixed gear. One of the through hole formed on the base end side of this movable gear and the pin inserted therethrough is provided with special form portions which can be thrust into the bush. With such arrangement, when the degree of parallelism between the teeth of the fixed gear and the teeth of the movable gear is not satisfactory, if the teeth of the movable gear are meshed with the teeth of the fixed gear, the teeth of the movable gear can be moved to the teeth of the fixed gear to make the mesh therewith excellent. As a result, it is possible to prevent a tilt backlash without using a bolt and a nut. That is, it is possible to reduce the number of the constituent parts, and to save a space for such parts. Further, it is also possible to reduce the number of the assembling steps, so as to effectively prevent a tilt backlash.

(Second Embodiment)

Figure 10:
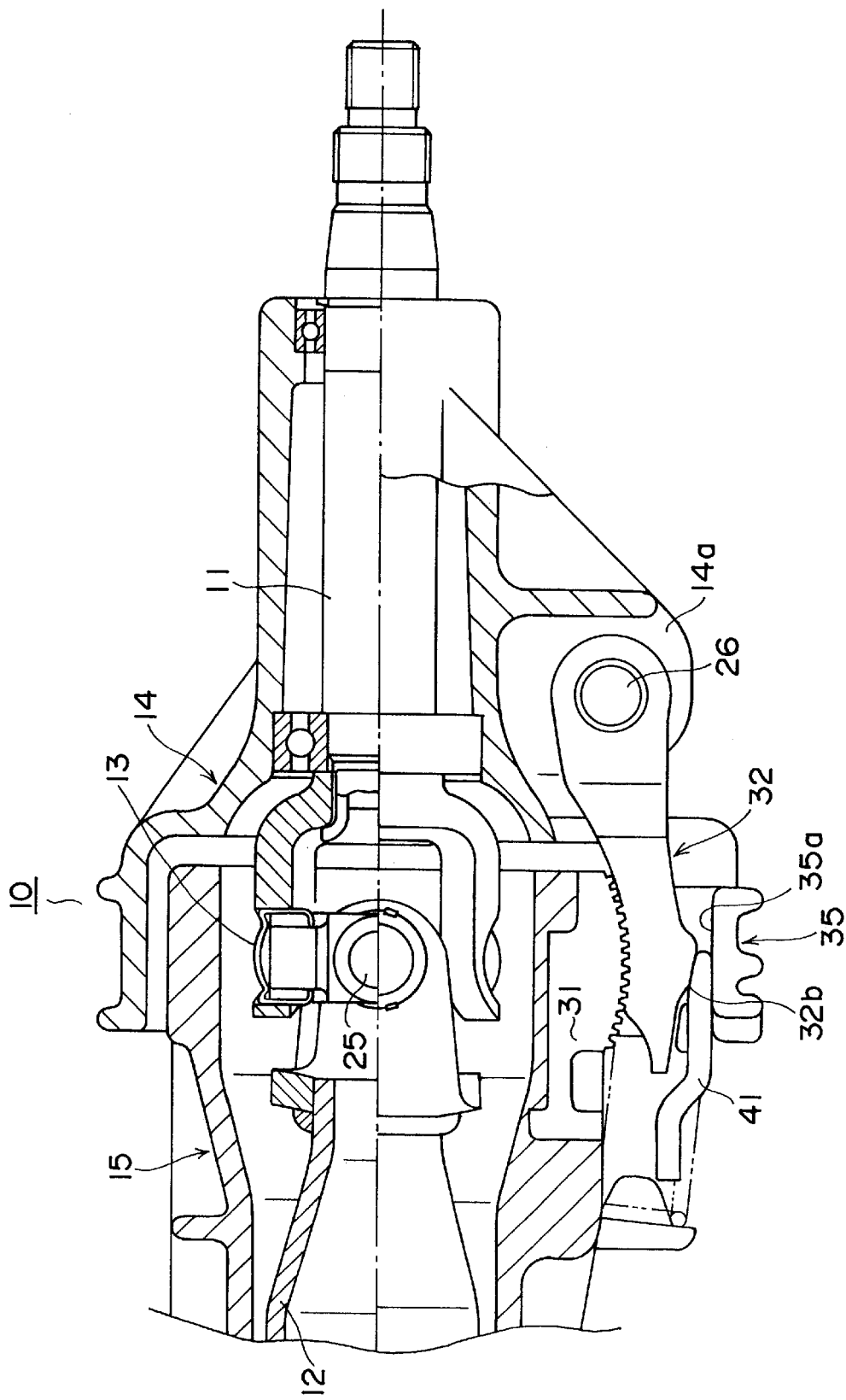
FIG. 10 is a longitudinal cross-sectional view of a tilt adjusting-type steering apparatus according to a second embodiment of the invention.
Figure 11:
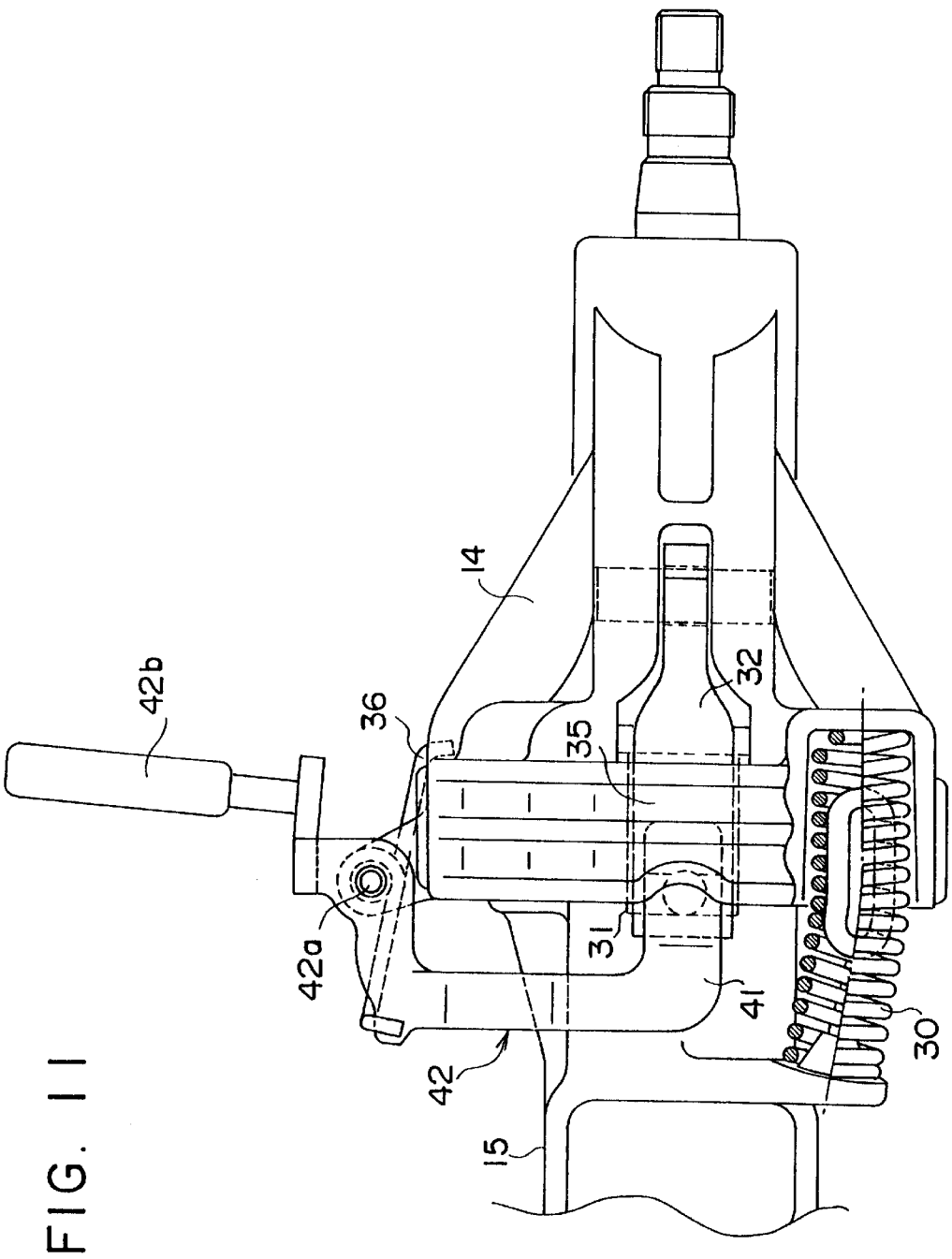
FIG. 11 is a bottom plan view of the tilt adjusting-type steering apparatus according to the second embodiment of the invention.

A second embodiment of the present invention is shown in FIG. 10 and FIG. 11. It should be noted that FIG. 10 is a view corresponding to FIG. 1 of the first embodiment, while FIG. 11 is a view corresponding to FIG. 2.

The second embodiment is different from the first embodiment mainly in the direction of inserting and removing a wedge member 41 which is reverse to that in the first embodiment. In the following description, different arrangements from the first embodiment will be mainly explained. The same arrangements as those in the first embodiment will be given the same referential numerals and description thereof will be omitted, as will also be the case for the third and fourth embodiments described later.

As shown in FIG. 11, the wedge member 41 is provided at the tip end of an operation arm 42, while an rocking center 42a is provided at the base end of the operation arm 42. An operation lever 42b is provided on the reverse side to the wedge member 41 using this rocking center 42a as the reference. The operation arm 42 is biased in the counter-clockwise direction by the spring 36.

With the above-mentioned arrangement, if the operation lever 42b is drawn to the right in FIG. 11 to overcome the biasing force of the spring 36, the whole operation arm 42 is rotated clockwise with the rocking center 42a as the center of rotation, and the wedge member 41 is moved to the left in FIG. 10 or FIG. 11 to be disposed at the release position, whereby the lock and the mesh of the teeth 32a of the movable gear 32 with respect to the teeth 31a of the fixed gear 31 is released. As a result, it becomes possible to adjust the height of the steering wheel. After this height adjustment, if the operation lever 42b is released, the operation arm 42 is rotated counter-clockwise by the spring 36, whereby the wedge member 41 is moved from the release position to the right in FIG. 10 or FIG. 11 to be inserted between the taper surface 32b of the movable gear 32 and the pressurization surface 35a of the reaction force member 35. Thus, the wedge member 41 is disposed at the lock position. In this manner, the mesh and the lock of the movable gear 32 with respect to the fixed gear 31 is conducted, and the lock of the upper column member 14 with respect to the lower column member 15 is also conducted, whereby the height adjustment of the steering wheel is completed.

The operation and the effects of the above-mentioned second embodiment are the same as those of the first embodiment. Specifically, the wedge member of the tilt lock mechanism can be made thin to have a small thickness (the vertical dimension in FIG. 10). Since it is covered with the reaction force member 35, the wedge member does not hit the driver's knees, and therefore, it is no possibility of releasing the lock of the movable gear 32.

(Third Embodiment)

Figure 12:
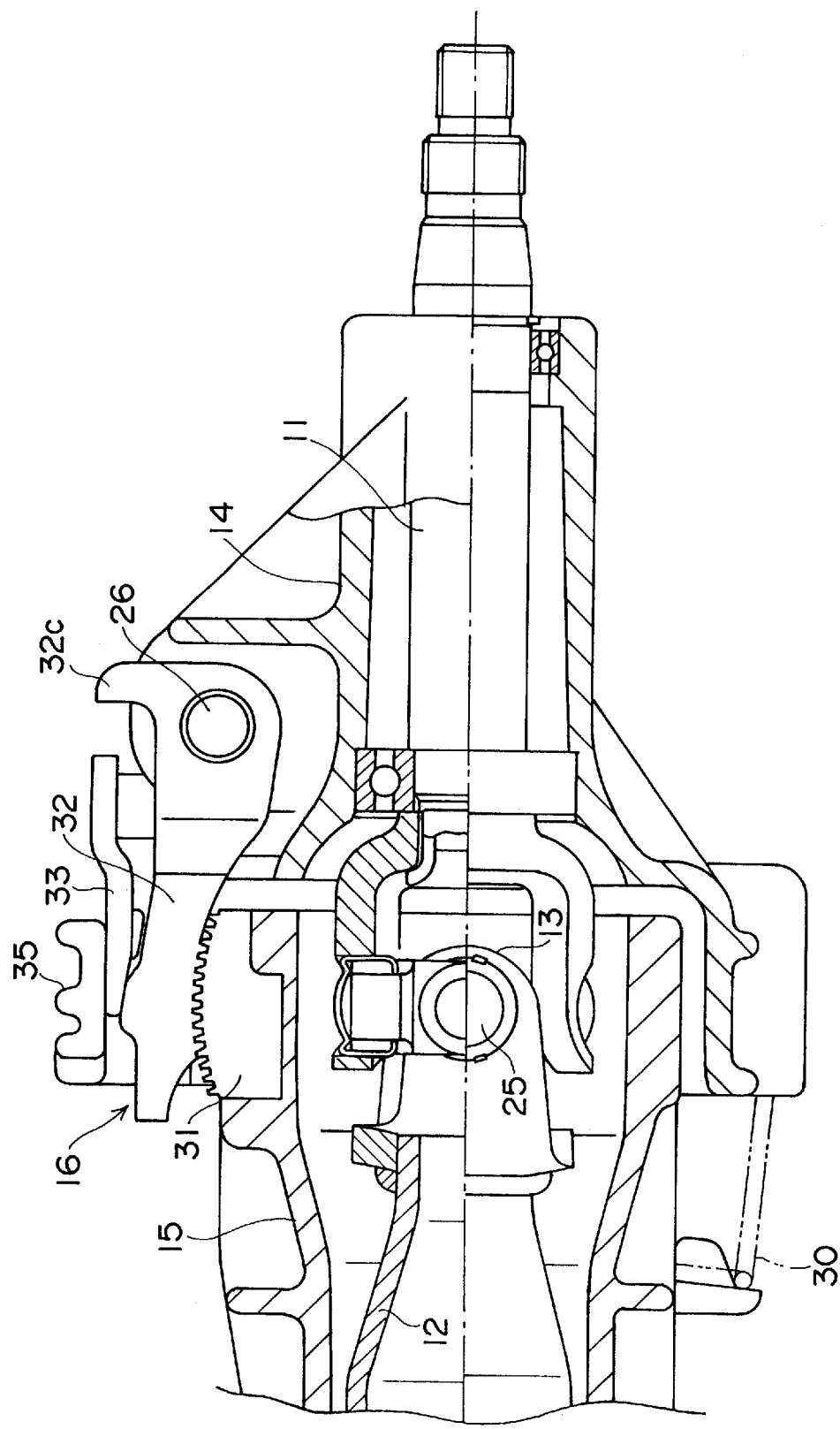
FIG. 12 is a longitudinal cross-sectional view of a tilt adjusting-type steering apparatus according to a third embodiment of the invention.
Figure 13:
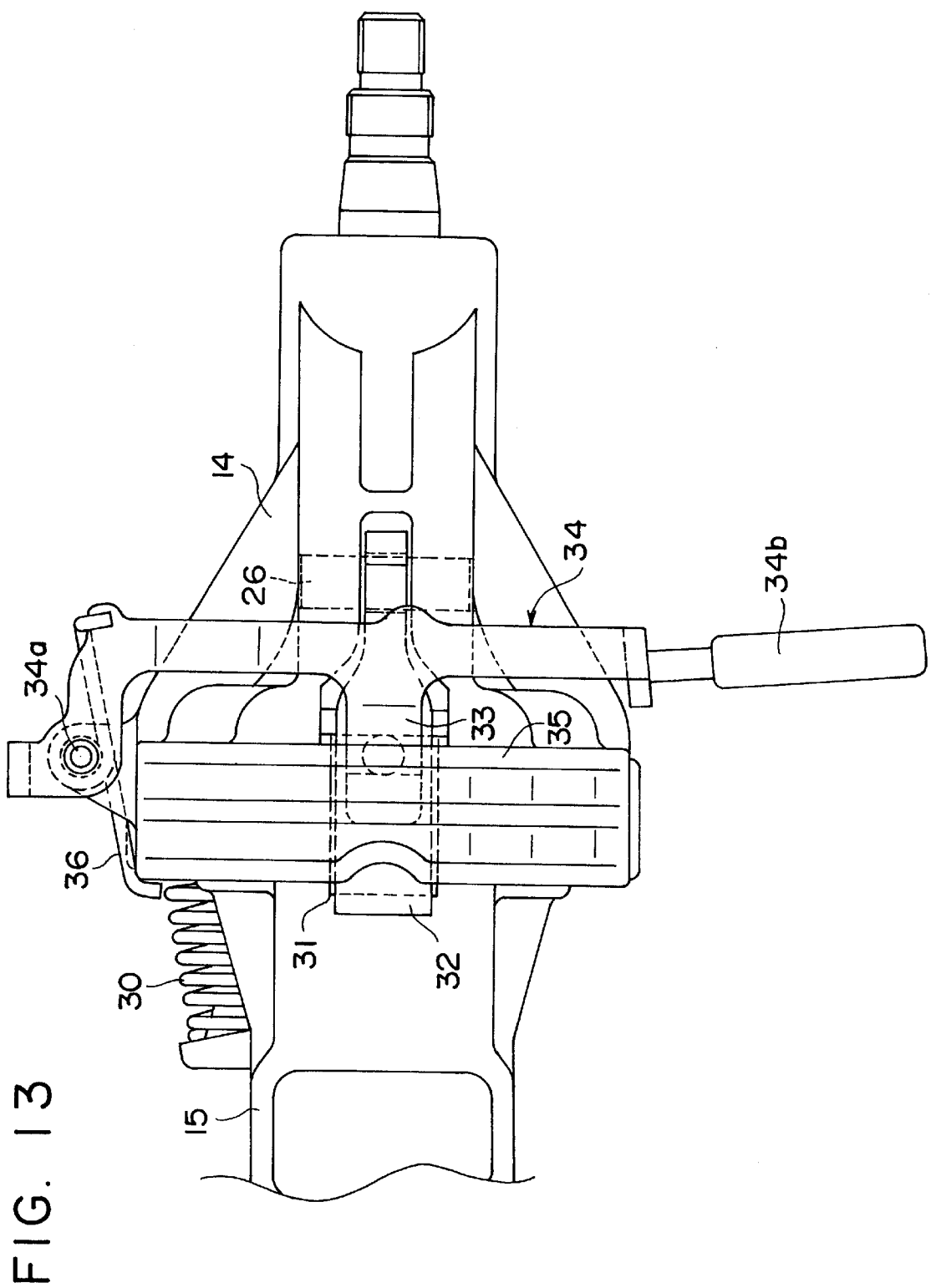
FIG. 13 is a top plan view of the tilt adjusting-type steering apparatus according to the third embodiment of the invention.

A third embodiment of the present invention is shown in FIG. 12 and FIG. 13. It should be noted that FIG. 12 is a view corresponding to FIG. 1 of the first embodiment mentioned above, while FIG. 13 is a top plan view of the embodiment.

The third embodiment is different from the first embodiment in that the tilt lock mechanism 16 disposed in a lower part in FIG. 1 in the first embodiment is disposed in an upper part in FIG. 12. Since the other arrangements are the same as those of the first embodiment, full description thereof will be omitted.

According to the third embodiment, there is no possibility at all that the tilt lock mechanism 16 including the wedge member 32 may hit the driver's knees. As a result, there is also no possibility that the driver's knees strike the wedge member 33 and release the lock of the movable gear 32 with respect to the fixed gear 31.

(Fourth Embodiment)

Figure 14:
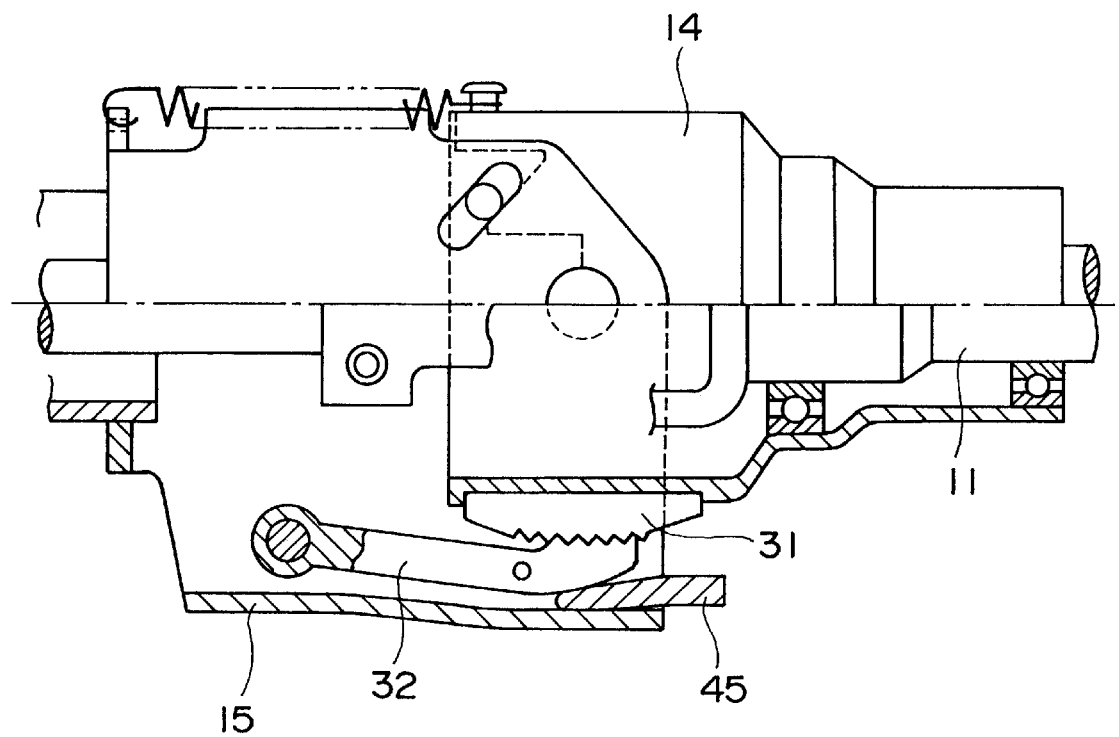
FIG. 14 is a longitudinal cross-sectional view of a tilt adjusting-type steering apparatus according to a fourth embodiment of the invention.

FIG. 14 shows a fourth embodiment of the present invention. It should be noted that FIG. 14 is a view corresponding to FIG. 1 of the first embodiment.

In each of the first to third embodiments described above, the fixed gear 31 is provided on the side of the lower column member 15, while the movable gear 32 is provided on the side of the upper column member 14. On the other hand, in the present fourth embodiment, the movable gear 32 is provided on the side of the lower column member 15, while the fixed gear 31 is provided on the side of the upper column member 14. That is, the present invention is also applicable to a tilt adjusting-type steering apparatus in which the fixed gear 31 and the movable gear 32 are disposed in the reverse way as mentioned above.

The operation and the effects of the present fourth embodiment are the same as those of the first and second embodiments, and description thereof will be omitted.

It is also possible to combine the present fourth embodiment with the above-described second embodiment so as to reverse the direction of inserting and removing the wedge member 45 to the direction shown in FIG. 14. The effects and operation in this case are the same as those in the second embodiment.

Further, it is possible to combine the present fourth embodiment with the above-described third embodiment so as to dispose the tilt lock mechanism 16 in an upper part of the apparatus, instead of a lower part in FIG. 14. The effects and operation in this case are the same as those in the third embodiment.

(Fifth Embodiment)

Figure 15:
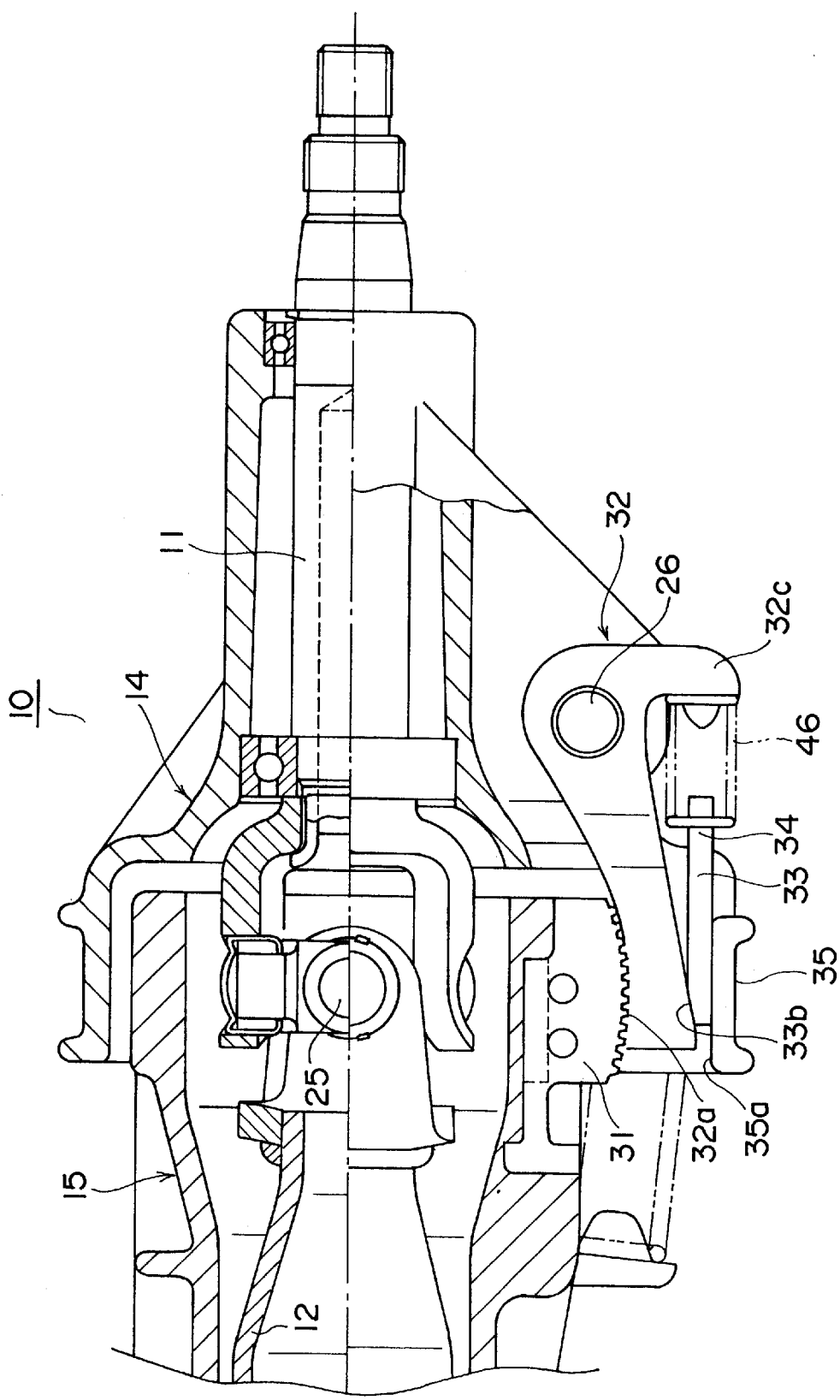
FIG. 15 is a longitudinal cross-sectional view of a tilt adjusting-type steering apparatus according to a fifth embodiment of the invention.
Figure 16:
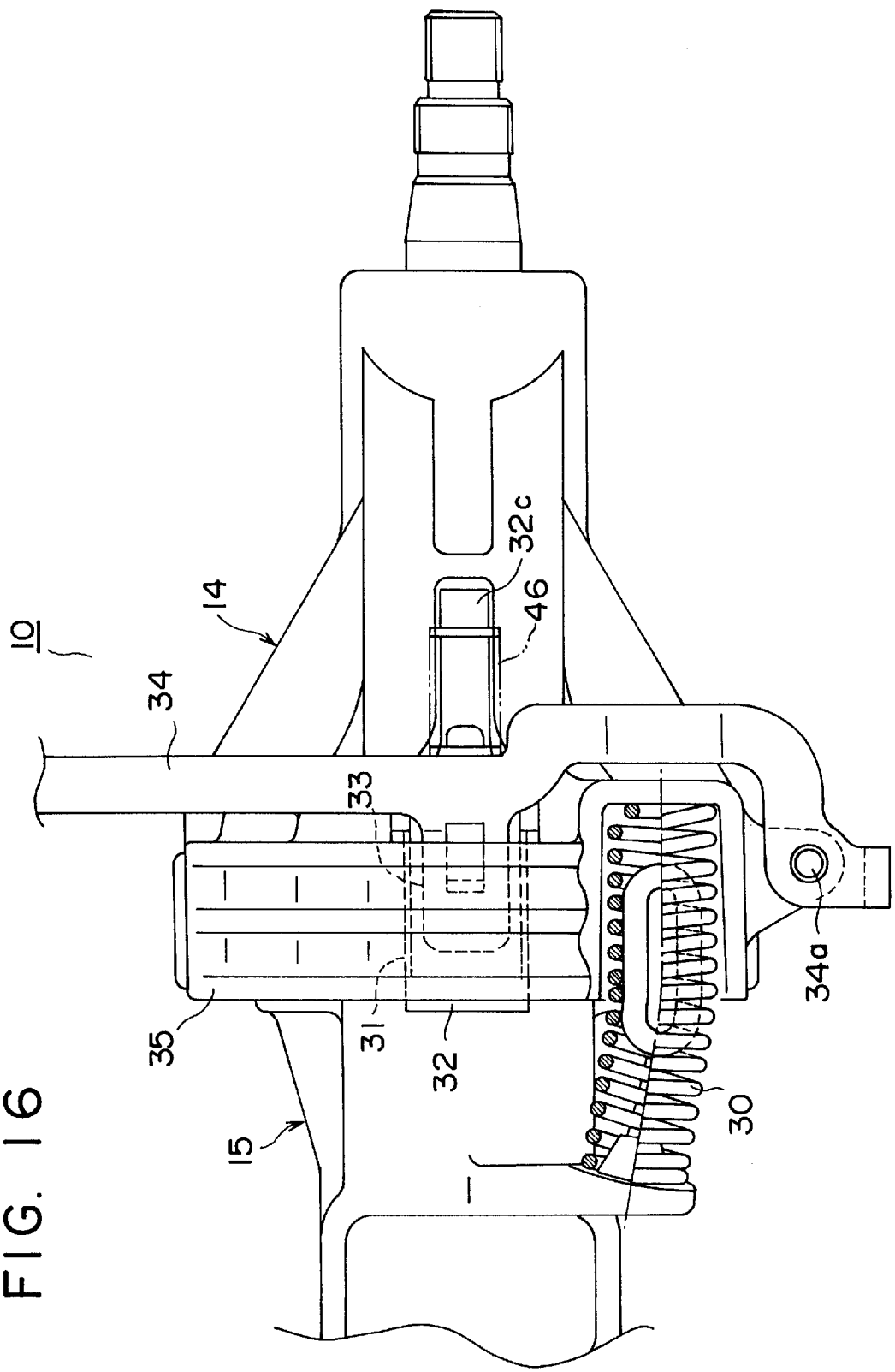
FIG. 16 is a bottom plan view of the tilt adjusting-type steering apparatus shown in FIG. 15.

A fifth embodiment of the present invention is shown in FIG. 15 and FIG. 16. FIG. 15 is a longitudinal cross-sectional view of a tilt adjusting-type steering apparatus according to the fifth embodiment, while FIG. 16 is a bottom plan view of the tilt adjusting-type steering apparatus shown in FIG. 15.

In any of the first to third embodiments described above, as a spring 36 for returning the operation arm 34, a torsion coil spring (36) is disposed around the rocking center 34a. However, instead of such arrangement, the present embodiment includes a compression coil spring 46 interposed between the protrusion 32c of the movable gear 32 and the operation arm 34.

With this arrangement, when the operation arm 34 is released in order to adjust the height of the steering wheel, if the operation arm 34 is not brought into contact with the protrusion 32c of the movable gear 32, the movable gear 32 can be rotated to be released owing to the biasing force of the compression coil spring. For this reason, the tilt lock can be released with a minimum amount of operation. Also, when the movable gear 32 is to be released, no metallic part is brought into contact therewith, so that a smoother operability can be obtained.

(Sixth Embodiment)

Figure 17:
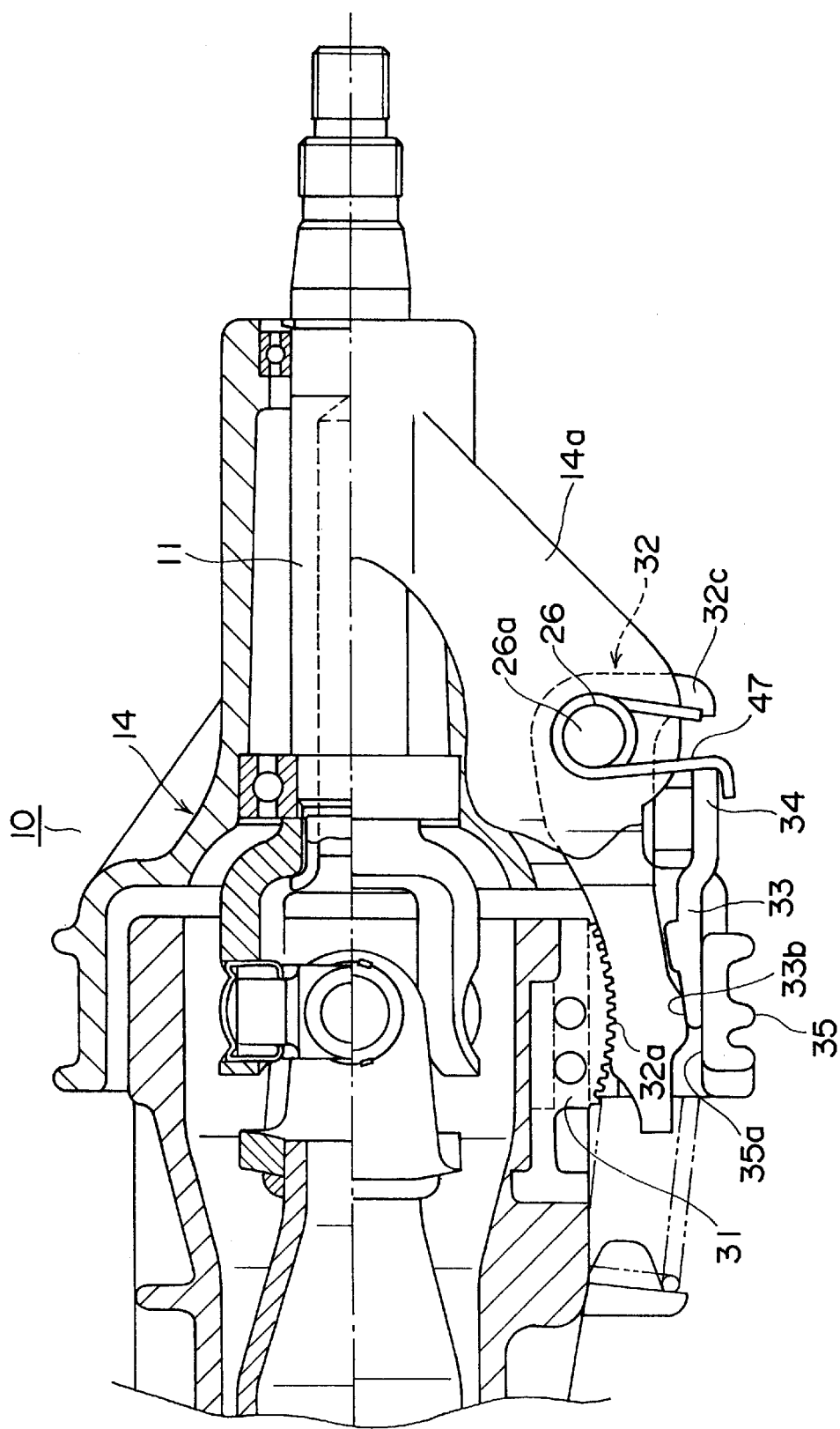
FIG. 17 is a longitudinal cross-sectional view of a tilt adjusting-type steering apparatus according to a sixth embodiment of the invention.
Figure 18:
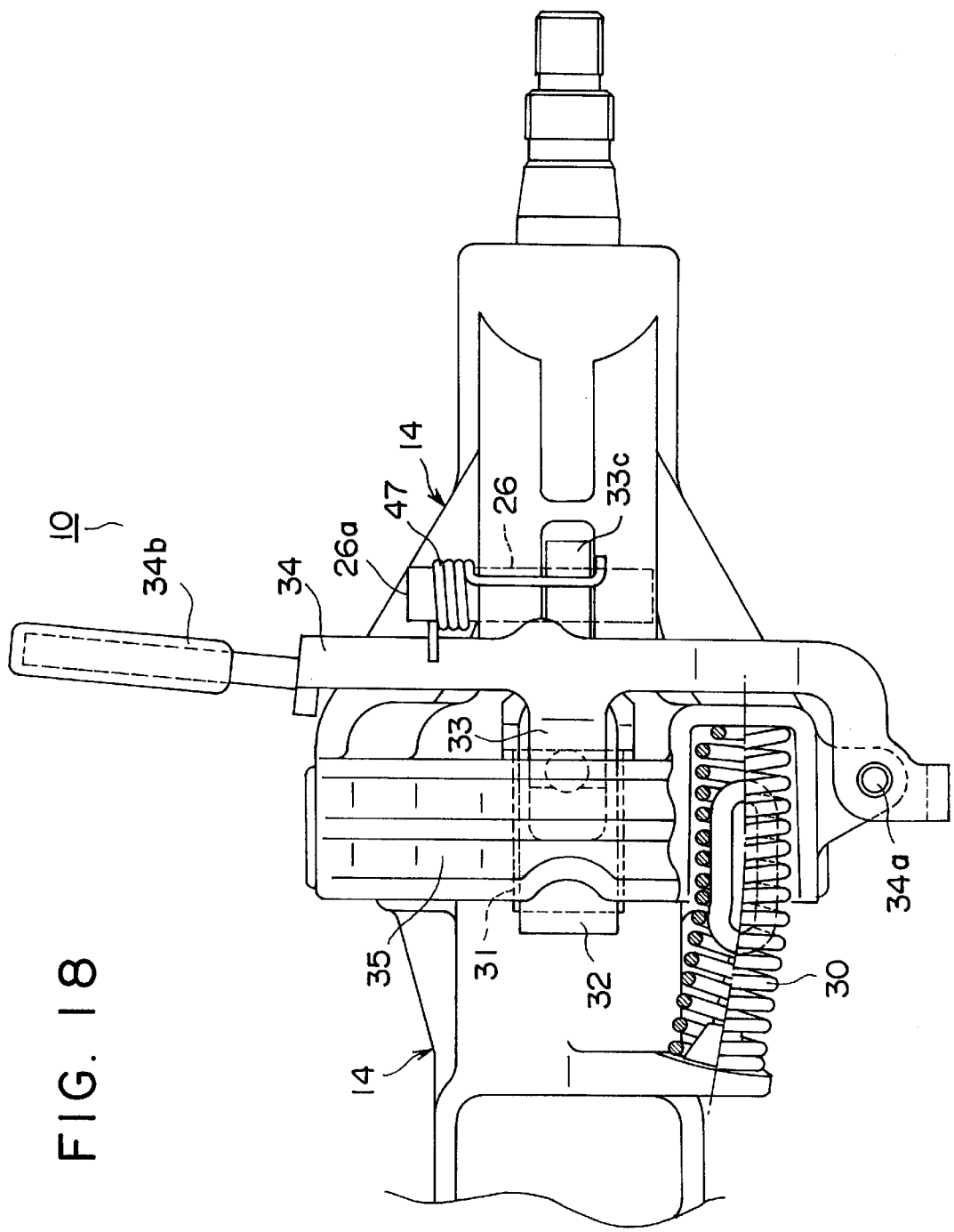
FIG. 18 is a bottom plan view of the tilt adjusting-type steering apparatus shown in FIG. 17.

A sixth embodiment of the present invention is shown in FIG. 17 and FIG. 18. FIG. 17 is a longitudinal cross-sectional view of a tilt adjusting-type steering apparatus according to the sixth embodiment, while FIG. 18 is a bottom plan view of the tilt adjusting-type steering apparatus shown in FIG. 17.

In the fifth embodiment described above, the compression coil spring 46 is interposed between the protrusion 32c of the movable gear 32 and the operation arm 34. However, in the present sixth embodiment, instead of such arrangement, a torsion coil spring 47 is interposed between the protrusion 32c of the movable gear 32 and the operation arm 34.

This torsion coil spring 47 is provided around an extended portion 26a which is formed by slightly extending the rocking center pin 26 of the movable gear 32, and both ends of this torsion coil spring 47 are bent in the form of a hook to be engaged with the operation arm 34 and the protrusion 32c of the movable gear 32, respectively.

With this arrangement, when the operation arm 34 is released in order to adjust the height of the steering wheel, even if the operation arm 34 is not brought into contact with the protrusion 32c of the movable gear 32, the movable gear 32 can be rotated to be released owing to the biasing force of the coil spring 47. For this reason, the tilt lock can be released with a minimum amount of operation. Also in this case, when the movable gear 32 is to be released, no metallic part is brought into contact therewith, so that an excellent operability can be obtained.

Figure 19:
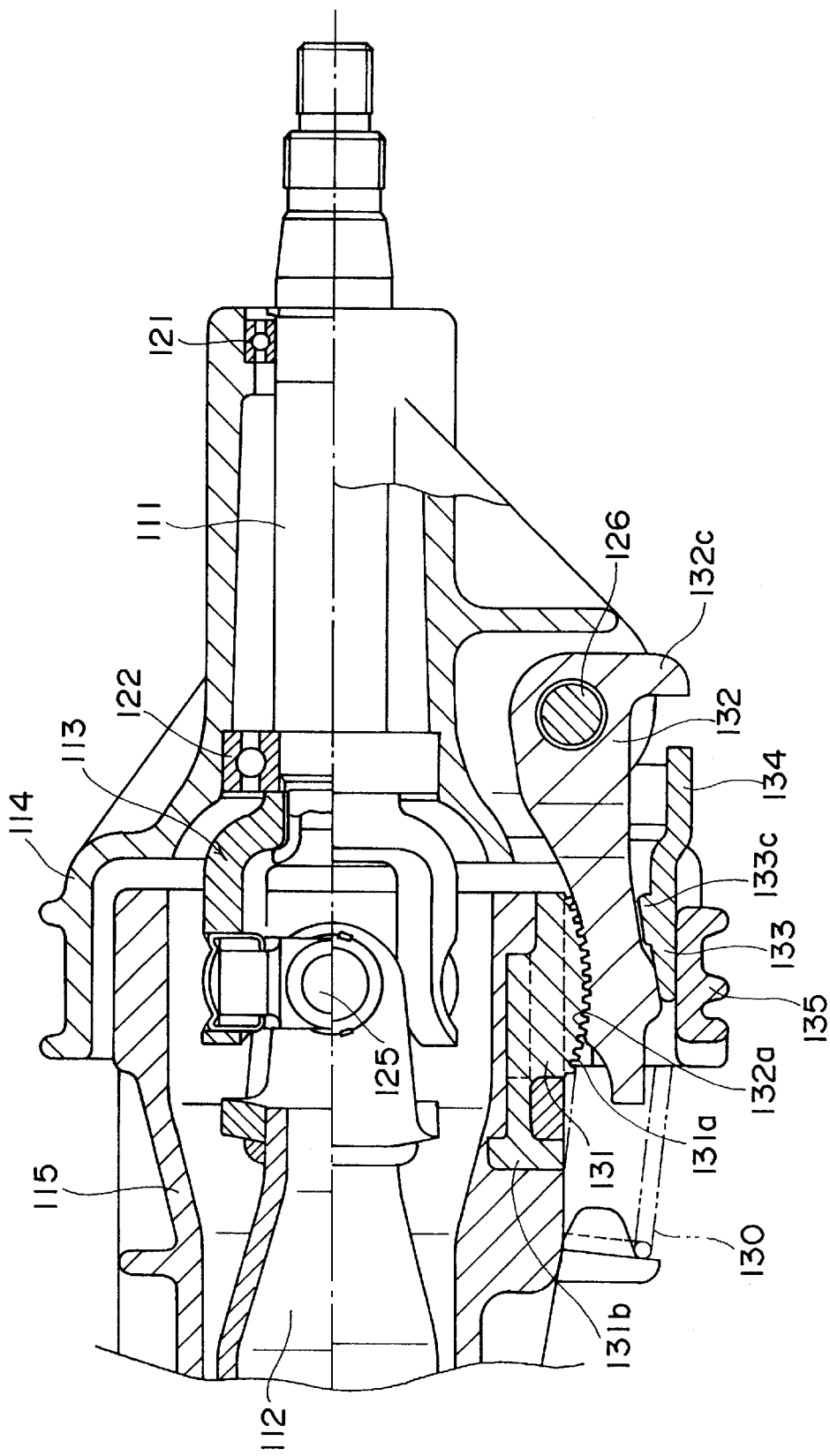
FIG. 19 is a longitudinal cross-sectional view of a tilt adjusting-type steering apparatus according to a seventh embodiment of the invention.
Figure 20:
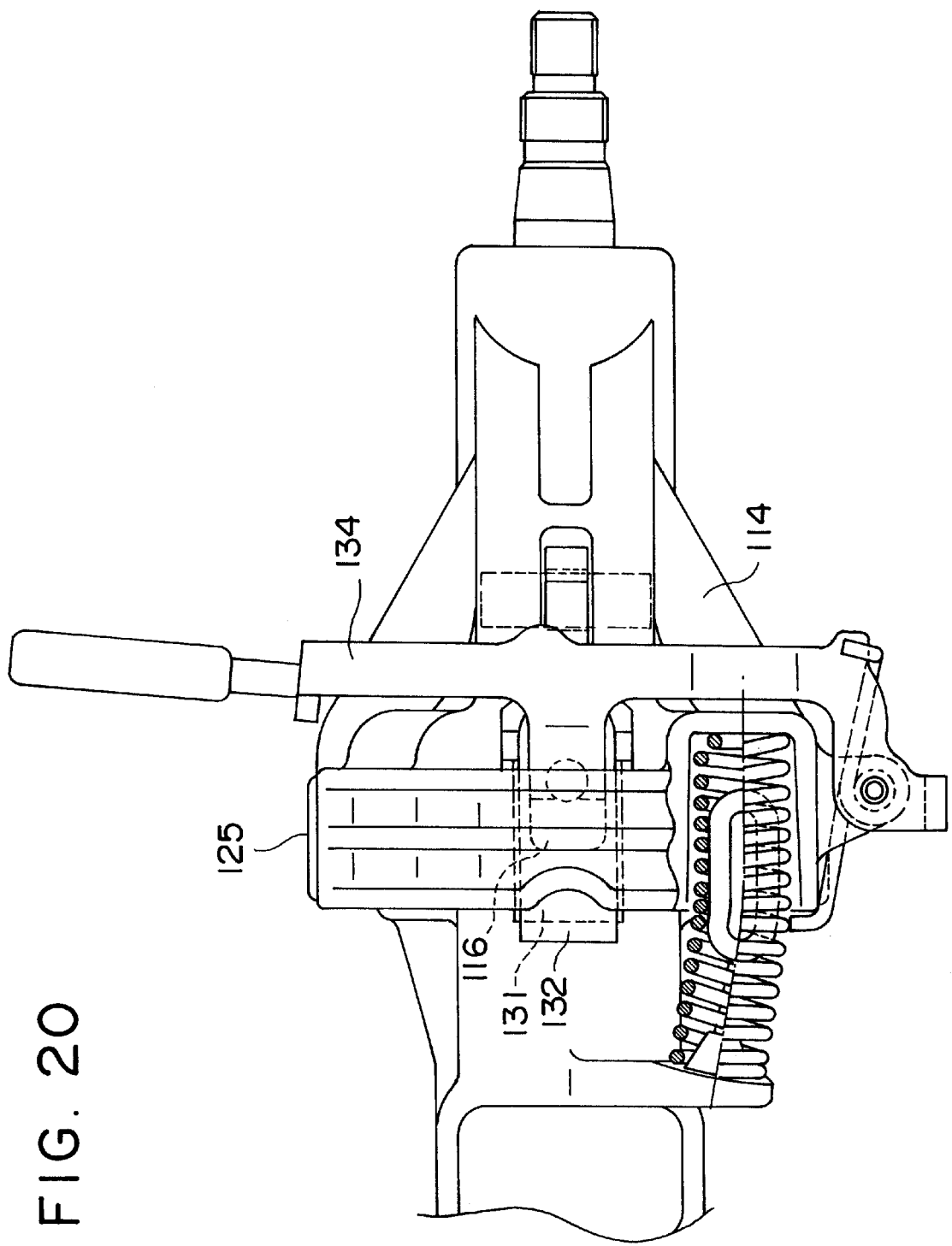
FIG. 20 is a bottom plan view of the tilt adjusting-type steering apparatus shown in FIG. 19, seen from below.

FIG. 19 is a longitudinal cross-sectional view of a tilt adjusting-type steering apparatus according to a seventh embodiment of the present invention, while FIG. 20 is a bottom plan view of the tilt adjusting-type steering apparatus shown in FIG. 19, seen from below.

First, a basic structure of the tilt adjusting-type steering apparatus will be described with reference to FIG. 19 and FIG. 20. A steering shaft is divided into a front steering shaft 112 and a rear steering shaft 111 to be coupled together with a universal joint 113. The front steering shaft 112 is accommodated into a lower bracket 115 which is fixed to the car body, while the rear steering shaft 111 is accommodated to be rotatable freely through bearings 121 and 122 in an upper bracket 114 which is provided to freely rock with respect to the lower bracket 115. The upper bracket 114 is arranged to rock around a pivot 125 which is provided on a side surface of the lower bracket 115.

In the seventh embodiment, a movable gear 132 pivotally supported by a pivot or pin 126 is provided on the upper bracket 114, while a fixed gear 131 fixed in a manner described later is provided on the lower bracket 115. Below the movable gear 132, an operation arm 134 provided with a wedge member 133 having a protrusion 133c is extended. Below the wedge member 133, there is provided a reaction force member 135 serving as a fixed member.

Accordingly, when the operation arm 134 is caused to rock, the movable gear 132 is pushed up by the wedge member 133 and the protrusion 133c, the teeth 132a of the movable gear 132 are engaged with the teeth 131a of the fixed gear 131, and in this state the wedge member 133 is locked between the movable gear 132 and the fixed member 135. On the other hand, when the operation arm 134 is caused to rock in a reverse direction, the wedge member 133 is released from the movable gear 132 to abut against the protrusion 132c for releasing the movable gear 132, whereby the teeth 132a of the movable gear 132 are forcibly released from the engagement with the teeth 131a of the fixed gear 131.

Further, in the present seventh embodiment, the lower bracket 115 is made from aluminum or magnesium by die casting, and when this lower bracket 115 is formed by die casting, the fixed gear 131 is cast in the same die. In this manner, it is possible to attach the fixed gear 131 to the lower bracket 115 accurately to be secured for a long term, while reducing the manufacturing cost of the apparatus.

Further, in the seventh embodiment, since the extended portion 131b extended from the fixed gear 131 is buried in the lower bracket 115, the fixed gear 131 is installed more securely.

Further in the seventh embodiment, since the above-mentioned lower bracket 115 is formed by die casting and, the fixed gear 131 is cast in the same die, it is no longer required to employ a method of fixing an engagement member on the fixed side by welding or by use of a caulking pin, or the like, unlike in the conventional structure. As a result, a troublesome installing process for fixing the fixed gear 131 can be eliminated, and the number of assembling steps and the constituent parts can be reduced, whereby the manufacturing cost can be decreased. Moreover, since the fixed gear 131 is cast in the lower bracket 115, it is possible to install the fixed gear 131 on the lower bracket 115 accurately to be secured for a long term.

Next, an eighth embodiment of the present invention will be described. The eighth embodiment relates to the form and the structure of teeth of a movable gear and those of a fixed gear. Basic arrangements of the tilt adjusting-type steering apparatus other than the forms and structures of the teeth may be those of any of the foregoing embodiments.

The eighth embodiment will be described below as having the basic structure shown in FIG. 19 and FIG. 20.

Figure 21A:
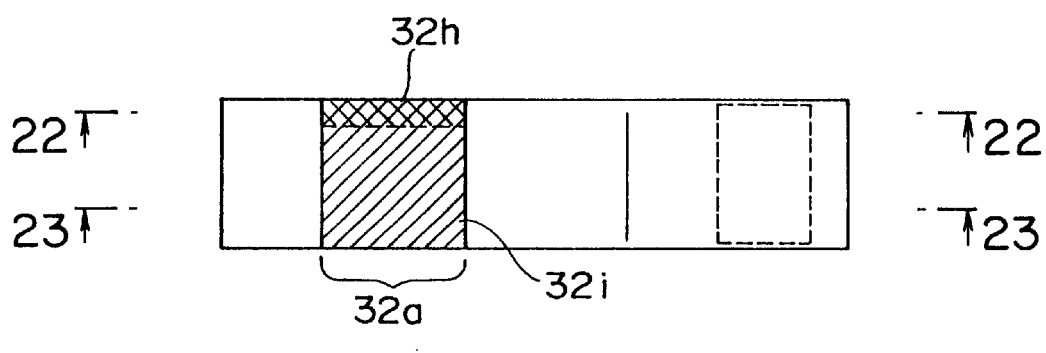
Figure 21B:
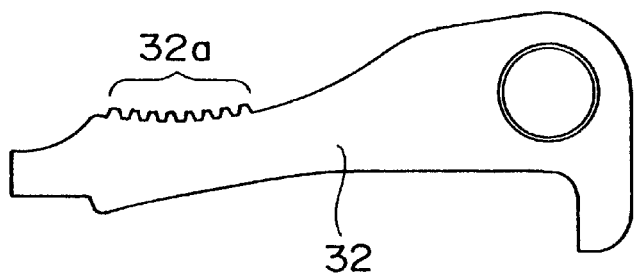
FIG. 21B is a side view of the movable gear.
Figure 22:
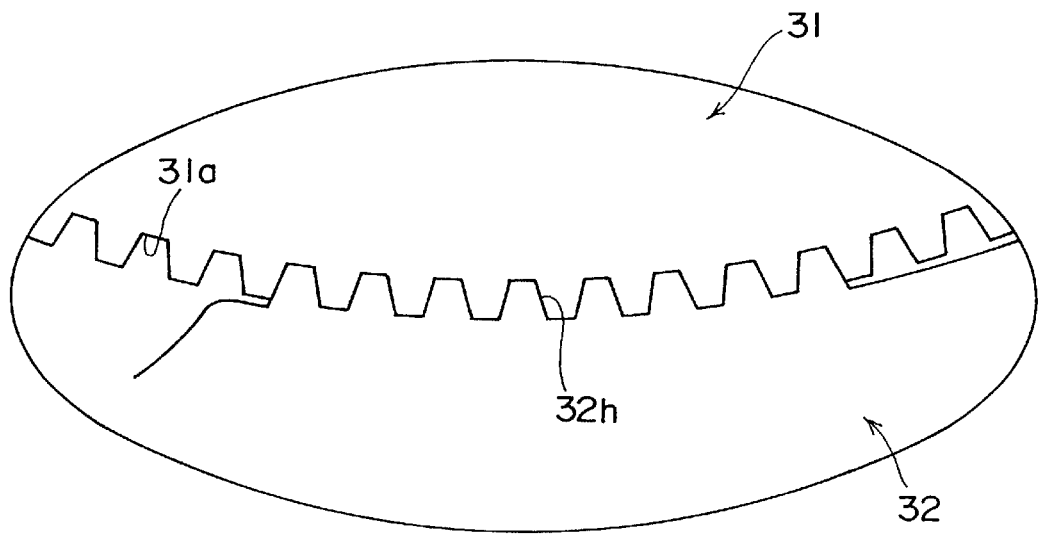
FIG. 22 is a side view of teeth in a part formed in accordance with the regular gear specifications.
Figure 23:
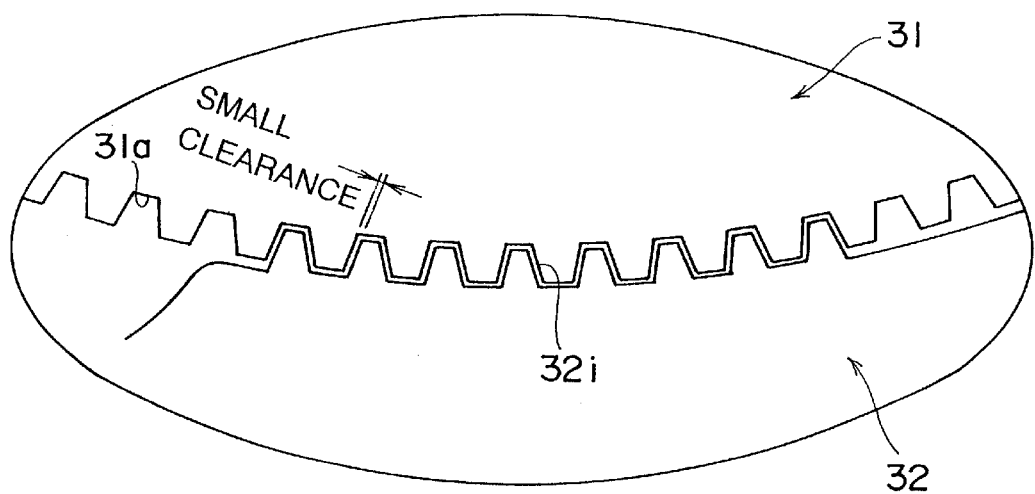
FIG. 23 is a side view of teeth in a part in which a clearance is formed between both the teeth of the fixed gear and the movable gear.
Figure 24:
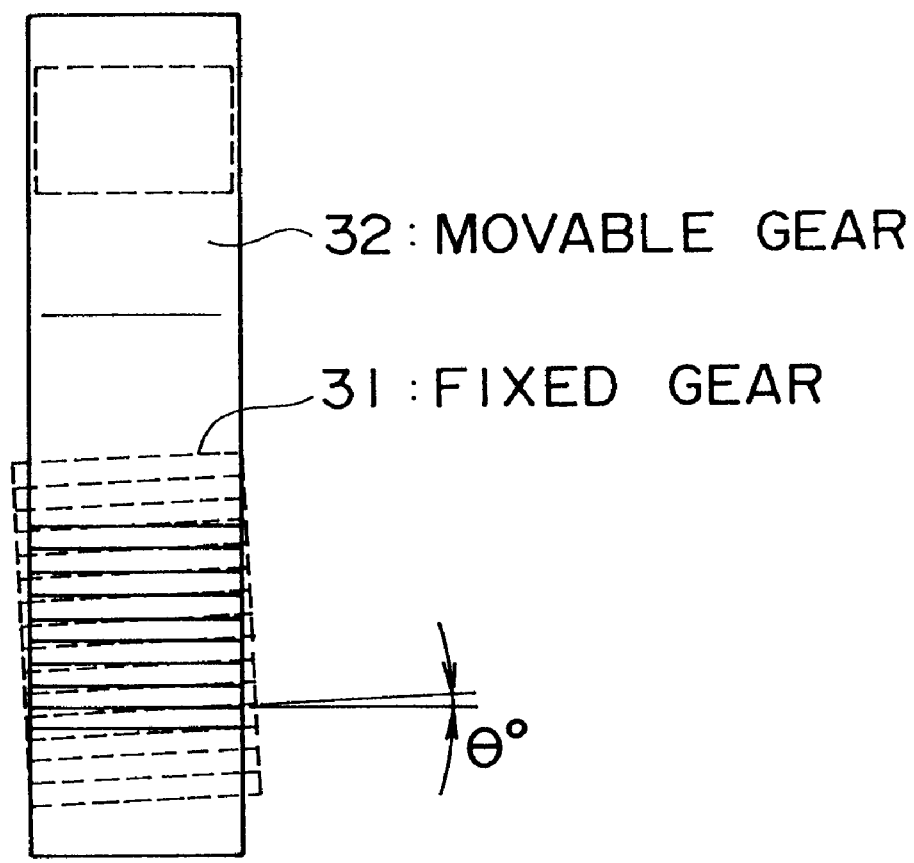
FIG. 24 is a plan view of the movable gear (an engagement member on the movable side) and a fixed gear.
Figure 26:
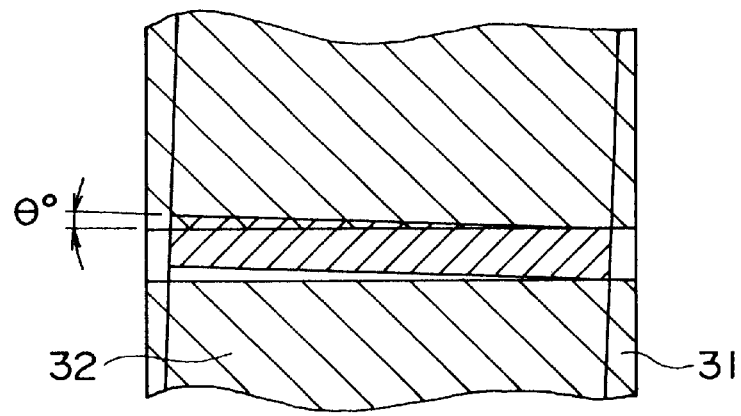
FIG. 26 is a view for showing a meshed state in a conventional apparatus.
Figure 27:
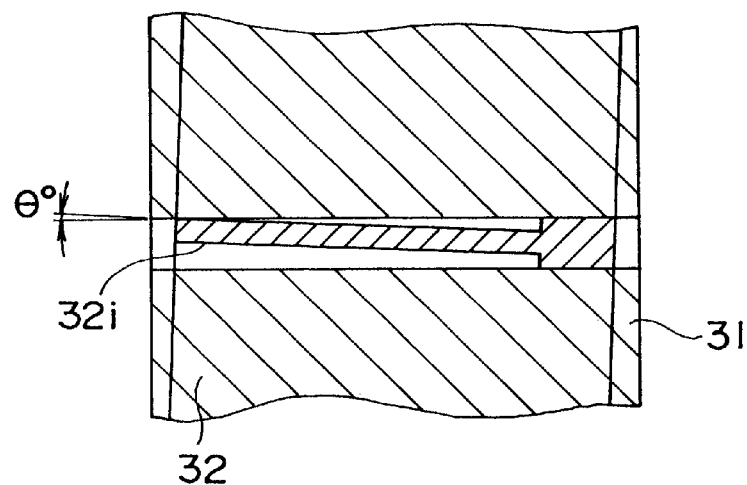
FIG. 27 is a view for showing a meshed state in the first embodiment.

FIG. 21A is a plan view of the movable gear (an engagement member on the movable side), FIG. 21B is a side view of the movable gear (the engagement member on the movable side), FIG. 22 is a side view of teeth in a portion formed in accordance with the regular gear specifications, FIG. 23 is a side view of teeth in a portion in which a clearance is formed between the teeth of both the gears, FIG. 24 is a plan view of the movable gear (the engagement member on the movable side) and the fixed gear (an engagement member on the fixed side), FIG. 25 is a schematic view for showing rocking movement amounts of the movable gear (the engagement member on the movable side) and the fixed gear (the engagement member on the fixed side), FIG. 26 is a view for showing a state of a mesh in a conventional apparatus, and FIG. 27 is a view for showing a state of the mesh in the eighth embodiment.

As shown in FIGS. 21A and 21B, part 32h of the teeth 32a of the movable gear 32 are formed in accordance with the regular gear specifications (FIG. 22), and the remaining part 32i are formed to have a small teeth thickness so as to generate a predetermined small clearance with the teeth 31a of the fixed gear 31 (FIG. 23). When the tooth thickness is formed to be thin, the part 32*h* may be formed by crowning or may be added with a step portion.

Accordingly, in a normal use, when the teeth in the part 32*h* of the movable gear 32 formed in accordance with the regular gear specifications are meshed with the teeth 31*a* of the fixed gear 31, a load applied on each of the teeth 31*a* and 32*a* is small, so that even if the parallelism between the movable gear 32 and the fixed gear 31 slightly deviates, a mesh with a sufficient strength can be attained so that no backlash is generated.

As shown in FIG. 24, if an angle of deviation of the parallelism between the movable gear 32 and the fixed gear 31 is set to be θ, amount of deviation between the gear 31 and the gear 32 is H1, as shown in FIG. 25 when the whole teeth are formed in accordance with the normal tooth specification if this angle is θ is the same. However, when there is provided the part 32*i* which is formed to have a small tooth thickness according to the present embodiment, the deviation amount becomes H2 and an absolute value of the deviation amount can be decreased. For this reason, in the conventional apparatus, as shown in FIG. 26, there is a possibility that the teeth may interfere with each other when the parallelism is deviated. However, in the present embodiment, as shown in FIG. 27, the teeth are not caused to interfere with each other so as to generate no backlash. It should be noted that in FIGS. 24 to 27, the angle θ is drawn in exaggeration.

Also, as stated above, the teeth 31*a* and 32*a* of both gears are meshed with each other only in the part 32*h* which are formed in accordance with the regular gear specifications. Thus, there is a possibility that the width of such meshed part becomes narrow and the surface pressure of the teeth is increased, thereby making the strength unsatisfactory. However, in a normal use, a load applied on each of the teeth 31*a* and 32*a* is small, so that the surface pressure of the teeth is not much increased. As a result, even if the width of the meshed part becomes narrow, there is no possibility at all that the strength of the mesh becomes unsatisfactory.

Further, when an excessive load input is received by the steering apparatus, as in the case of collision, the teeth in the remaining part 32*i* which are formed to have a predetermined small clearance with the teeth 31*a* of the fixed gear 31 can be also meshed with the teeth 31*a* of the fixed gear 31, so that a mesh with a satisfactory strength can be realized and an excessive load can be endured.

Further, it is no longer necessary to make the processing accuracy especially high, unlike in the conventional apparatus, and to fix the gears 31, 32 by welding or by means of a bolt and a nut. As a result, the manufacturing cost can be decreased, the number of the constituent parts can be reduced, and further, the weight of the apparatus can be lightened.

Figure 28:
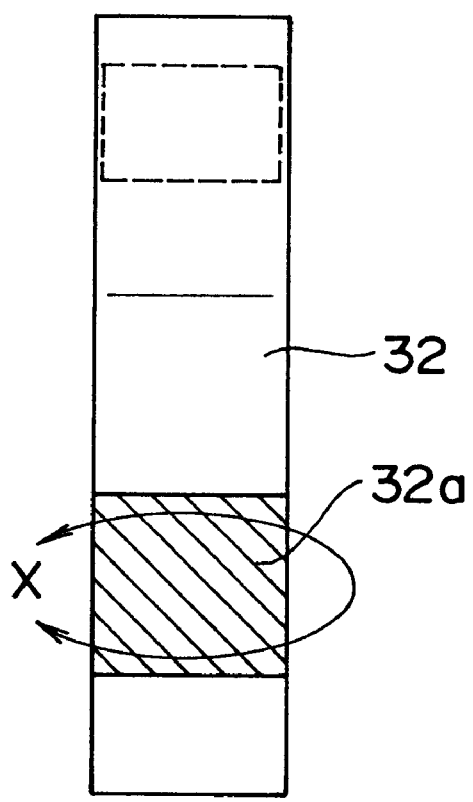
FIG. 28 is a plan view of the movable gear (the engagement member of the movable side).
Figure 29A:
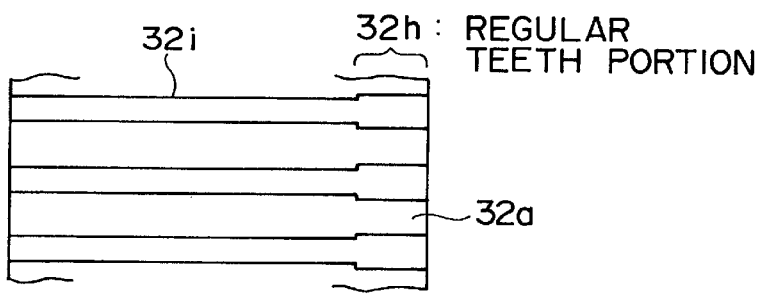
FIG. 29A is an enlarged view of the portion X of FIG. 28 according to an eighth embodiment.
Figure 29B:
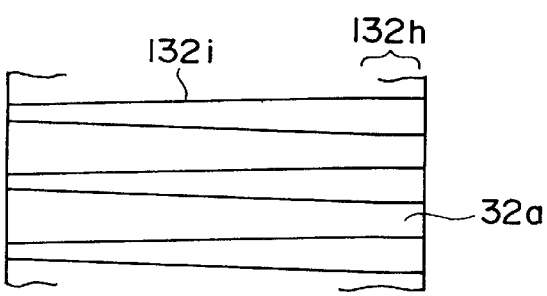
FIG. 29B is an enlarged view of the portion X of FIG. 28 according to a first variation of the eighth embodiment.
Figure 29C:
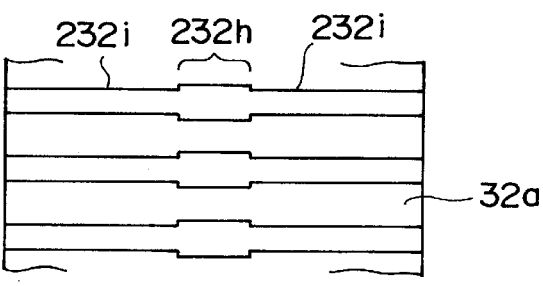
FIG. 29C is an enlarged view of the portion X of FIG. 28 according to a second variation of the eighth embodiment.
Figure 29D:
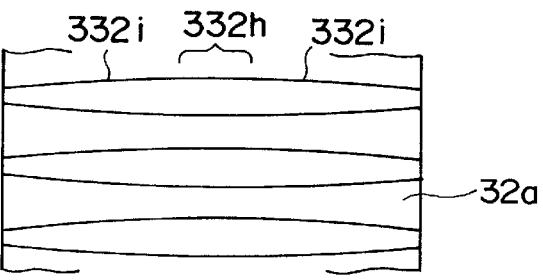
FIG. 29D is an enlarged view of the portion X of FIG. 28 according to a third variation of the eighth embodiment.
Figure 29E:
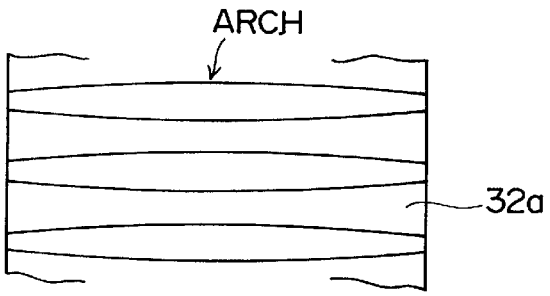
FIG. 29E is an enlarged view of the portion X of FIG. 28 according to a fourth variation of the eighth embodiment.

Next, variations of different kinds are shown in FIGS. 28 to 29E. FIG. 28 is a plan view of the movable gear (the engagement member on the movable side), FIG. 29A is an enlarged view of the portion X in FIG. 28 according to the above-described eighth embodiment, FIG. 29B is an enlarged view of the portion X in FIG. 28 according to a first variation of the eighth embodiment, FIG. 29C is an enlarged view of the portion X in FIG. 28 according to a second variation, FIG. 29D is an enlarged view of the portion X in FIG. 28 according to a third variation, and FIG. 29E is an enlarged view of the portion X in FIG. 28 according to a fourth variation.

In the above eighth embodiment, there is formed a step between the part 32*h* of the teeth formed in accordance with the regular gear specifications and the part 32*i* of the teeth which are formed to have a small thickness.

On the other hand, according to the first variation, as shown in FIG. 29B, part 132*h* which are formed in accordance with the regular gear specifications are provided at the end of the teeth 32*a* portion. However, the part 132*h* which are formed to be thin are formed to be tapered and the parts 132*h* and 132*i* are formed to be continuous.

According to the second variation, as shown in FIG. 29C, part 232*h* which are formed in accordance with the regular gear specifications are provided not at the end of the teeth 32*a*, but in a central portion of the teeth 32*a*.

According to the third variation, as shown in FIG. 29D, part 332*h* of the teeth formed in accordance with the regular gear specifications are provided substantially in a central portion of the engagement teeth 32*a*. Part 332*i*, of the teeth are formed to be thin and are tapered, and the two parts 332*h* and 332*i* are formed to be continuous.

According to the fourth variation, as shown in FIG. 29E, part which are formed in accordance with the regular gear specifications are not clearly distinguished from part formed with a small tooth thickness, and the whole tooth portion is formed in a circular arc. As a result, there are substantially formed the part formed in accordance with the regular gear specifications and the part formed to have a small tooth thickness.

It should be noted that the present invention is not limited to the embodiments and variations described above, and various modifications can be made. For example, in any of the foregoing embodiments, the teeth 32*a* of the movable gear 32 (the engagement member on the movable side) are provided with the parts 32*i*, 132*i*, 232*i*, 332*i* having the small tooth thickness. However, the teeth of the fixed gear 31 (the engagement member on the fixed side) may be provided with the part having a small thickness. Also, in any of the foregoing embodiments, both gears 31 and 32 (the engagement member on the fixed side and the engagement member on the movable side) are circular gears. However, a gear in the present invention is not limited to these, but may take any of various forms such as a flat gear (rack).

As described above, according to the eighth embodiment of the present invention, part of the teeth at least in the width direction of the teeth of at least either one of the movable gear and the fixed gear are formed in accordance with the regular gear specifications, while the remaining part are formed to have a predetermined clearance with the other teeth. For this reason, in the normal use, if part of the teeth at least in the width of one of the engagement members formed in accordance with the regular gear specifications is meshed with the teeth of the other of the engagement members, a load applied on each of the teeth becomes small, so that if the parallelism between the teeth of the both members slightly deviates, a mesh with a satisfactory strength can be realized and no backlash is generated.

Also, when an excessive load input is received by the steering apparatus, such as in the case of collision, the remaining part of the teeth which are formed to have a predetermined clearance with the teeth of the other engagement member can be meshed with the teeth of the other engagement member, so that a mesh with a sufficient strength can be attained and an excessive load can be satisfactorily endured.

Further, it is no longer required to make the processing precision to be remarkably high, unlike in the conventional apparatus, and the engagement members are not required to be fixed by welding or a bolt and a nut, whereby the manufacturing cost and the number of constituent parts can be reduced. In addition, the weight of the apparatus can be lightened.

As described above, according to the present invention, the tilt lock mechanism for causing the movable gear to mesh with the fixed gear to be locked comprises the wedge member which is detachably inserted between the reaction force member and the back surface of the movable gear. This wedge member can be formed to be thin. Also, this wedge member is covered with the reaction force member in a state in which it is disposed at the lock position, so that it is possible to effectively prevent the wedge member from hitting the driver's knees or the lock from being released thereby without specially providing, for example, a cover, (that is, without increasing the number of constituent parts,) and without narrowing a space in the vicinity of the driver's knees.

What is claimed is:

1. A tilt adjustable steering apparatus comprising a lower steering shaft adapted to be provided with a steering gear at a lower end thereof, an upper steering shaft adapted to be provided with a steering wheel at an upper end thereof, said lower steering shaft and said upper steering shaft being coupled with each other by a universal joint, a lower column member supporting said lower steering shaft to be rotatable and adapted to be fixed to a body of a vehicle, an upper column member supporting said upper steering shaft to be rotatable and being rockably supported by a tilt shaft mounted on said lower column member, and a tilt lock mechanism which locks said upper column member with respect to said lower column member, characterized in that:

said tilt lock mechanism comprises a fixed gear fixedly supported by one of said lower column member and said upper column member, said fixed gear having a toothed surface arranged substantially arcuately about an axis of said tilt shaft;

a movable gear rockably supported by the other of said lower column member and said upper column member to be selectively meshed with said toothed surface of said fixed gear;

a reaction force member disposed in a vicinity of a back surface of said movable gear, said reaction force member being integrally provided with said other of said lower column member and said upper column member; and a wedge member having a lock position at which it is inserted between said reaction force member and the back surface of said movable gear to cause said movable gear to mesh with said toothed surface of said fixed gear and a release position at which it is retracted from the lock position to release said movable gear from said fixed gear;

said fixed gear, said movable gear, said wedge member, and said reaction force member being arranged such that surface portions thereof cooperating to lock said upper column member with respect to said lower column member in the lock position of said wedge member overlie each other in a plane perpendicular to an axis of the rocking movement of said movable gear and intersecting a laterally intermediate portion of said fixed gear.

2. A tilt adjustable steering apparatus according to claim 1, characterized in that:

said movable gear comprises a base end portion having a through hole and a main body portion having a plurality of teeth capable of meshing with teeth of said fixed gear;

a pin is received by said through hole and by support portions of said upper column member;

a bush is interposed between an outer peripheral surface of said pin and an inner peripheral surface of said through hole; and one of said outer peripheral surface of said pin and said inner peripheral surface of said through hole is formed with portions which are thrust into a part of said bush in response to a force tending to twist said main body portion of said movable gear due to a mesh between said teeth of said fixed gear and said teeth of said movable gear, thereby adjusting the mesh between said teeth of said fixed gear and said teeth of said movable gear.

3. A tilt adjustable steering apparatus according to claim 1, wherein said fixed gear and a bracket of one of said column members constitute an integral die casting.

4. A tilt adjustable steering apparatus according to claim 1, wherein at least one of said fixed gear and said moveable gear has teeth with portions formed in accordance with regular gear specifications and portions formed to have a predetermined clearance from teeth of the other gear in a meshed state of the gears.

5. A tilt adjusting-type steering apparatus according to claim 1, wherein said reaction force member is integrally formed with said other of said lower column member and said upper column member.

6. A tilt adjustable steering apparatus according to claim 1, further comprising:

an operation member integrally formed with said wedge member and selectively moving said wedge member between said lock position and said released position.

7. A tilt adjustable steering apparatus according to claim 6, wherein said operation member is manually operable to move said wedge member.

8. A tilt adjustable steering apparatus according to claim 7, wherein said operation member is rockably supported to said upper column member.

9. A tilt adjustable steering apparatus according to claim 1, further comprising:

a biasing member disposed between said movable gear and said wedge member to urge said movable gear out of meshed engagement with said toothed surface of said fixed gear.

10. A tilt adjustable steering apparatus according to claim 1, wherein said fixed gear is disposed on a periphery of said one of said lower column member and said upper column member.

11. A tilt adjustable steering apparatus according to claim 10, wherein said one of said lower column member and said upper column member supports said fixed gear in back of said toothed surface along substantially an entire length of said toothed surface.

12. A tilt adjustable steering apparatus according to claim 1, wherein said one of said lower column member and said upper column member supports said fixed gear in back of said toothed surface along substantially an entire length of said toothed surface.

13. A tilt adjustable steering apparatus comprising a lower steering shaft adapted to be provided with a steering gear at a lower end thereof, an upper steering shaft adapted to be provided with a steering wheel at an upper end thereof, said lower steering shaft and said upper steering shaft being coupled with each other by a universal joint, a lower column member supporting said lower steering shaft to be rotatable and adapted to be fixed to a body of a vehicle, an upper column member supporting said upper steering shaft to be rotatable and being rockably supported by a tilt shaft mounted on said lower column member, and a tilt lock mechanism which locks said upper column member with respect to said lower column member, characterized in that:

said tilt lock mechanism comprises a fixed gear disposed on one of said lower column member and said upper column member;

a movable gear rockably supported by the other of said lower column member and said upper column member to be selectively engaged with said fixed gear;

a reaction force member disposed in a vicinity of a back surface of said movable gear; and a wedge member having a lock position at which it is inserted between said reaction force member and the back surface of said movable gear to cause said movable gear to mesh with said fixed gear and a release position at which it is retracted from the lock position to release said movable gear from said fixed gear;

said fixed gear, said movable gear, said wedge member, and said reaction force member being arranged such that surface portions thereof cooperating to lock said upper column member with respect to said lower column member in the lock position of said wedge member overlie each other in a plane perpendicular to an axis of the rocking movement of said movable gear and intersecting a laterally intermediate portion of said fixed gear, said movable gear comprises a base end portion having a through hole and a main body portion having a plurality of teeth capable of meshing with teeth of said fixed gear;

a pin is received by said through hole and by support portions of said upper column member;

a bush is interposed between an outer peripheral surface of said pin and an inner peripheral surface of said through hole; and one of said outer peripheral surface of said pin and said inner peripheral surface of said through hole is formed with portions which are thrust into a part of said bush in response to a force tending to twist said main body portion of said movable gear due to a mesh between said teeth of said fixed gear and said teeth of said movable gear, thereby adjusting the mesh between said teeth of said fixed gear and said teeth of said movable gear.

* * * * *